United States Patent
Vicari et al.

[11] Patent Number: 6,114,489
[45] Date of Patent: *Sep. 5, 2000

[54] REACTIVE HYPERBRANCHED POLYMERS FOR POWDER COATINGS

[75] Inventors: Richard Vicari; Olan Stanley Fruchey; Kathleen Nelson Juneau, all of Corpus Christi, Tex.; Shelby Freland Thames; James Wayne Rawlins, both of Hattiesburg, Miss.

[73] Assignee: Herberts GmbH, Cologne, Germany

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/826,192

[22] Filed: Mar. 27, 1997

[51] Int. Cl.$^7$ .................................... C08G 18/42
[52] U.S. Cl. ......................... 528/84; 525/423; 525/424; 525/425; 525/426; 525/450; 525/119; 525/124; 528/45; 428/423.1; 428/474.4; 428/480
[58] Field of Search ..................... 525/450, 423, 525/424, 425, 426, 119, 124; 528/45, 84; 428/423.1, 474.4, 480

[56] References Cited

U.S. PATENT DOCUMENTS

| | | | |
|---|---|---|---|
| 5,270,402 | 12/1993 | Figuly | 525/440 |
| 5,561,214 | 10/1996 | Yeske et al. | 528/363 |

FOREIGN PATENT DOCUMENTS

| | | |
|---|---|---|
| 9612754 | 5/1996 | WIPO . |
| 9619537 | 6/1996 | WIPO . |
| 9723538 | 7/1997 | WIPO . |

*Primary Examiner*—Rachel Gorr
*Attorney, Agent, or Firm*—Pillsbury Madison & Sutro LLP

[57] ABSTRACT

Novel powder coating compositions containing reactive hyperbranched polymers are disclosed and claimed. Preferred embodiments include powder coating compositions formed from hyperbranched polyesters having terminal hydroxy, carboxy, epoxy, and isocyanate groups. Preferred hyperbranched polyesters are formed from α,α-bis-(hydroxymethyl)-propionic acid, which act either as crosslinkers, adhesion promotors, or flow and leveling agents. A process for the synthesis of powder coating compositions is also disclosed which involves (a) self condensation of one or more of the multifunctional monomers to form the hyperbranched polymer, optionally, in the presence of suitable reactive end-capping moieties which are described herein; (b) melt blending of the hyperbranched polymer with suitable amounts of one or more of polyesters, epoxy resins, blocked urethane resins, or acrylic resins, a crosslinker, and one or more of suitable additional ingredients including degassers or flow and leveling agents, to form a flake; and (c) grinding and sieving of the flake to form the powder coating composition. These compositions exhibit improved flow and curing properties. These compositions can therefore be formed into thin films and can be cured at low temperatures to form smooth surfaces. Additionally, these films are hard and exhibit enhanced impact resistance properties than the conventional polyester resins. Thus, these powder coating compositions find utilities in automotive, packaging, and appliances.

30 Claims, No Drawings

REACTIVE HYPERBRANCHED POLYMERS FOR POWDER COATINGS

BACKGROUND OF THE INVENTION

1. Field of the Invention

The present invention relates to novel powder coating compositions for forming films having enhanced mechanical properties. This invention also relates to a process of making the powder coatings. More specifically, the invention relates to novel powder coating compositions containing novel aliphatic hyperbranched polymers, which function either as polymeric crosslinkers or as flow and leveling agents.

2. Description of the Prior Art

Powder coating compositions containing a wide variety of polymeric binders are very well-known. Some of the known powder coatings, particularly, the ones which may relate to the present invention are briefly described herein below. A number of different types of hyperbranched polymers have also been reported in the prior art, some of which are briefly described below.

However, there is a need for improved powder coating formulations having enhanced mechanical properties that are low temperature or photo-curable and can be applied onto non-metallic surfaces. For example, the powder coatings having low melt viscosities are extremely desirable such that they can be readily applied onto a wide variety of surfaces to form thin and smooth films without the formation of the undesirable "orange peel". Another property sought after is low glass transition ($T_g$) polymeric binder (base resin) containing powder coatings, which cures to high glass transition compositions after application. Even yet an important property sought after is powder coating compositions containing polymeric binders, which can be cured either at lower temperatures or using actinic sources such that they can be applied onto non-metallic surfaces such as wood and plastic. Improved chemical and solvent resistance properties are also highly desirable. None of the prior art references described below feature all of these desirable attributes.

Therefore, it is an objective of this invention to provide novel powder coatings that exhibit properties as described hereinabove. These compositions contain novel hyperbranched polymers. The hyperbranched polymers of this invention can be used either as polymeric binders (i.e., base resin), crosslinkers, adhesion promoters, as well as flow and leveling agents depending upon their chemical structure. This invention also provides a process for making these novel hyperbranched polymers. The hyperbranched polymers of this invention are also found to possess adhesive properties.

PRIOR ART

The following references are disclosed as background prior art in accordance with the terms of 37 CFR 1.56, 1.97, and 1.98.

U.S. Pat. No. 5,587,418 describes a thermosetting coating composition which can be used in a 2-coat, 1-bake method on a polyolefinic substrate.

U.S. Pat. No. 5,580,660 describes the use of a binder composition for powder coatings for use as a topcoat in the automotive industry.

U.S. Pat. No. 4,880,487 describes hot melt adhesive compositions which are especially useful for bonding polyamide articles to surfaces. The adhesive composition contains an ethylene-vinyl ester copolymer or a polyamide polymer, and additionally contains a poly(p-hydroxystyrene) homopolymer or a copolymer of poly(p-hydroxystyrene) with a $C_1$ to $C_4$ alkyl acrylate.

U.S. Pat. No. 4,824,909 discloses a new powder coating composition that contains a polyester resin, blocked isocyanate, and an acrylic resin.

U.S. Pat. No. 4,818,791 discloses a resin composition for use in powder paint that contains either a polyester resin containing both hydroxyl and carboxyl groups and vinyl monomer containing both glycidyl and hydroxyl groups; or a polyester resin containing both hydroxyl and carboxyl groups, glycidyl group containing vinyl polymer, and hydroxyl group containing vinyl polymer.

U.S. Pat. No. 5,554,701 discloses crosslinked polyesters made from decahydronaphthalene dimethanol as useful components in thermosetting powder coating compositions.

U.S. Pat. No. 5,508,349 describes a thermoset powder coating composition and method of application, which includes a copolymer having a reactive functionality selected from the group consisting of epoxy, carboxy, and hydroxy functionalities and mixtures thereof U.S. Pat. No. 5,491,202 discloses a low gloss powder coating composition and method for coating therewith which is based on three different thermosetting polyester resins and a hardener.

U.S. Pat. No. 5,182,337 describes a thermosetting powder coating composition which has good handling properties in which the composition comprises a co-reactable particulate mixture of a carboxylic acid group containing acrylic polymer, a second carboxylic acid group containing polyester, a beta-hydroxyalkylamide crosslinker, and an amorphous acid group containing polyester.

U.S. Pat. No. 4,214,040 teaches a cross-linkable, saturated polyester resin as useful binder for the powder paints in association with divalent metal oxides.

U.S. Pat. No. 5,591,809 discloses a process for preparing hyperbranched polymers by the reaction of an aromatic branching monomer with a core monomer, and an end-capping monomer.

U.S. Pat. No. 5,567,795 discloses a process for preparing hyperbranched polymers by the reaction of an aromatic branching monomer and an end-capping monomer.

U.S. Pat. No. 5,561,214 discloses hyperbranched polyaspartate esters and a process for their preparation. The polyaspartates are formed by the self-condensation of derivatized aspartic acid in which the amino groups have been reacted with a wide variety of amino alcohols.

U.S. Pat. No. 5,418,301 discloses a dendritic macromolecule and process for preparation thereof. The dendritic macromolecule is a polyester type comprising a central initiator molecule or initiator polymer having one or more reactive hydroxyl groups.

U.S. Pat. No. 5,041,516 teaches a method of producing novel dendritic molecules by a convergent process.

U.S. Pat. No. 5,270,402 discloses hyperbranched, functional polyesters, which are crosslinked and end-capped.

U.S. Pat. No. 5,136,014 discloses hyperbranched, functional polyesters prepared by self-condensation of $AB_n$ type monomers.

U.S. Pat. No. 3,669,939 discloses condensation polymers which are prepared by the condensation of polyhydroxy monocarboxylic acid of the formula $(HOCH_2)_2$ ($R_3$) C—COOH, wherein $R_3$ is a straight or branched chain alkyl, with at least one other mono-carboxylic acid containing a complementary reactive group such as hydroxy or amino group.

International laid open patent No. WO 96/07688 describes the use of hyperbranched polyesters as radiation curable resins in which hyperbranched polyesters are formed from the reaction of polyols and aromatic carboxylic anhydrides, which were subsequently reacted with glycidyl methacrylate, or allyl glycidyl ether.

*J. Am. Chem. Soc.* 1996, Vol. 118 (P. 6388–6395) discloses synthesis, characterization, and $^1$H NMR self-diffuision studies of dendritic aliphatic polyesters based on 2,2-bis(hydroxymethyl)-propionic acid and 1,1,1-tris (hydroxyphenyl)ethane, which were synthesized in the convergent fashion.

*J. Polym. Sci.: Part A: Polym Chem.* 1993, Vol. 31 (p. 619–614) discloses synthesis, characterization, and curing of hyperbranched allyl ether-maleate functional ester resins.

All of the references described herein are incorporated herein by reference in their entirety.

SUMMARY OF THE INVENTION

Surprisingly, it has been found in accordance with the present invention that powder coating compositions containing novel hyperbranched polymers can readily be formed. These compositions are found to meet most of the unmet needs of the prior art compositions as mentioned hereinabove. Most notably, the powder coating compositions of the present invention feature low melt viscosity and can be applied onto a wide variety of metallic and non-metallic surfaces in the form of thin films. Additionally, these compositions can be cured either at low temperatures or using actinic radiation sources such as UV and e-beam. The films formed from the powder coatings of the present invention are hard and feature enhanced impact resistance properties. There is no precedence to such powder coating compositions in the prior art.

Thus, in accordance with the present invention there is provided a powder coating composition comprising an intimate blend in a finely divided form of:
(a) a polymeric binder including a mixture of:
  (i) a hyperbranched polymer formed from one or more of self-condensable monomers and having at least two terminal reactive functional groups; and
  (ii) a polymer selected from the group consisting of epoxy, polyester, acrylic, and blocked urethane polymers having a reactive functionality selected from the group consisting of epoxy, carboxy, hydroxy, amides, and blocked isocyanate functionalities and mixtures thereof; and
(b) a co-reactant capable of reacting with the reactive functionality on said polymeric binder (a) selected from the group consisting of aminoplasts, blocked aliphatic diisocyanates, blocked aromatic diisocyanates, triglycidyl isocyanurate, dicarboxylic acid anhydrides, dicyanadiamide and its derivatives and mixtures thereof.

In another facet of the present invention there is also provided a process for the preparation of these novel powder coating compositions.

In yet another facet of the present invention it has also been found that the novel hyperbranched polymers of this invention can also be used as co-reactants, polymeric crosslinkers, or as flow and leveling agents in powder coating compositions. A process for making these compositions has also been disclosed.

Still yet another facet of this invention provides novel hyperbranched polymers which are prepared by the condensation of two or more self-condensable monomers, which are optionally either end-capped or chain extended and end-capped.

In another aspect of the present invention a process for the preparation of novel hyperbranched polymers is also provided. The process involves aqueous or non-aqueous dispersion polycondensation of a variety of self-condensable monomers to form hyperbranched polymers featuring well controlled molecular architecture. These hyperbranched polymers can further be end-capped or chain extended and end-capped in the same step or in a subsequent step.

In still a further aspect of this invention novel adhesive compositions containing hyperbranched polymers are also provided. The hyperbranched polymers of this invention by themselves or suitably end-capped or chain extended and end-capped are found to be useful as hot melt adhesives, pressure sensitive adhesives, radiation curable adhesives, and as an active component in two-pack adhesive systems. A process for adhering surfaces of two similar or dissimilar articles together is also provided which involves providing adhesive composition containing the hyperbranched polymer or its variants between the two surfaces and subjecting it to suitable conditions to form an adhesive bond between the surfaces.

Other aspects and advantages of the present invention are described further in the following detailed description of the preferred embodiments thereof.

DETAILED DESCRIPTION OF THE INVENTION

In general, the present invention provides a powder coating composition comprising an intimate blend in a finely divided form of:
(a) a polymeric binder including a mixture of:
  (i) a hyperbranched polymer formed from one or more of self-condensable monomers and having at least two terminal reactive functional groups; and
  (ii) a polymer selected from the group consisting of epoxy, polyester, acrylic, and blocked urethane polymers having a reactive functionality selected from the group consisting of epoxy, carboxy, hydroxy, amides, and blocked isocyanate functionalities and mixtures thereof; and
(b) a co-reactant capable of reacting with the reactive functionality on said polymeric binder (a) selected from the group consisting of aminoplasts, blocked aliphatic diisocyanates, blocked aromatic diisocyanates, triglycidyl isocyanurate, dicarboxylic acid anhydrides, dicyanadiamide and its derivatives and mixtures thereof.

As used herein, the term polymeric binder is used in a general term to mean a wide variety of polymeric materials that are commonly used in various powder coating compositions known in the art. Polymeric binders are also referred to as base resins or base polymers, or base polymeric resins.

The hyperbranched polymers used in the powder coating compositions of the present invention are novel compositions and are described in more detail below. Briefly, these polymers are used as polymeric binders as such or in combination with a wide variety of polymeric binders known in the art. Thus, the ratio of hyperbranched polymers to the other polymeric resins that can be used here may range from about 100:0 to about 10:90.

Any polymer or resin that will function as a polymeric binder can be used in combination with the hyperbranched polymers of this invention. Suitable polymeric binders include, but not limited to, polyesters, acrylic resins, blocked urethane polymers and epoxy resins. Useful polyester resins are obtained by condensation polymerization reaction between a saturated poly-basic acid or its anhydride and a polyalcohol. Examples of dibasic acids and dicarboxylic acid anhydrides for this purpose include phthalic acid, phthalic anhydride, isophthalic acid, terephthalic acid, hexahydrophthalic anhydride, pyromellitic anhydride, succinic acid and adipic acid. Examples of useful polyols are ethylene glycol, triethylene glycol, propylene glycol, dipropylene glycol, glycerin, trimethylolpropane, pentaerythritol, neopentyl glycol and hydrogenated bisphenol-A. As the commercial polyester resins therefor, for example, "McWHORTER 30-3000" and "McWHORTER 30-3002," trademarks of McWHORTER Technologies Inc.; and "Alftalac N-745" a trademark of Vianova Resins may be enumerated.

Suitable epoxy resins that can be used in this invention include bisphenol-A type epoxy resins, novolac epoxy resins or alicyclic epoxy resins. Examples of suitable acrylic resins are those well-known in the art and are generally made by the copolymerization of functional monomers such as acrylic acid and various copolymerizable monomers. Suitable copolymerizable monomers include olefinic unsaturated monomers such as ethylene, propylene and isobutylene, aromatic monomer such as styrene, vinyltoluene and α-methyl styrene, esters of acrylic acid and methacrylic acid with alcohols having 1 to 18 carbon atoms such as methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, cyclohexyl acrylate, cyclohexyl methacrylate, 2-ethylhexyl acrylate, 2-ethylhexyl methacrylate, lauryl acrylate, lauryl methacrylate, vinyl esters of carboxylic acids having 2 to 11 carbon atoms such as vinyl acetate, vinyl propionate and vinyl 2-ethylhexylacrylate and other co-monomers such as vinyl chloride, acrylonitrile and methacrylonitrile. These co-monomers can be used singly or as a mixture of two or more of them.

Examples of suitable blocked urethane polymers are those which are well-known in the art and are generally made by the polycondensation of isocyanates with a variety of polyols. It is critical that the isocyanate end-groups in theses polymers are blocked. The blocked isocyanates react with the co-reactants to form the powder coatings during the application step.

Any co-reactants may be used provided that they are capable of reacting either with the hyperbranched polymers of this invention or the polymeric binders mentioned hereinabove. As used herein, the term co-reactant is intended to mean a class of molecules that are either monomeric or polymeric and are capable of reacting with various other types of molecules. The co-reactants of this invention are also often called as crosslinkers, crosslinking agents, and hardeners. The types of co-reactants employed depends upon the nature of the end groups in the hyperbranched polymers or the various types of polymeric binders employed.

Co-reactants for the polyester resins having hydroxyl groups, for example, include acid anhydrides, such as pyromellitic anhydride, trimellitic anhydride, phthalic anhydride, and succinic anhydride; aminoplasts, such as hexamethoxymethylolmelamine, trimethylolmelamine trimethyl ether, hexamethylolnelamine hexamethyl ether, hexamethylolmelamine and trimethylolbenzoguanamine, as the commercial product therefor, for example, "POWDERLINK 1174" a trademark of American Cyanamide Co., may be used; glycol urils; and blocked aliphatic and aromatic diisocyanates, such as blocked hexamethylene diisocyanate, blocked isophorone diisocyanate and blocked polymethylene polyphenyl-isocyanate, as the commercial products therefor, for example, "ADDUCT B-1065", "ADDUCT B-1530" and "ADDUCT BF-1540", all trademarks of Huls AG and "McWHORTER 24-2431" a trademark of McWHORTER Technologies Inc., may be enumerated.

Co-reactants for the polyester resins having carboxyl groups include, for example, glycidyl compounds and amide compounds. The glycidyl compounds are those having two or more glycidyl groups, such as diglycidyl terephthalate, diglycidyl p-oxybenzoate, triglycidyl isocyanurate, compounds of hydantoin, cycloaliphatic epoxy resins, aliphatic epoxy resins, epoxy resins based on bisphenol-A, epoxy resins based on cresol novolacs, epoxy resins based on phenol novolacs and the like. The amide compounds may be those having two or more functional groups of hydroxy etc., such as tetra-β-hydroxyalkyl amide. As the commercial product therefor, for example, "PRIMID XL-552" a trademark of Rohm & Haas Co. may be enumerated.

Co-reactants for the epoxy resins include dicyanadiamide and its derivatives; acid anhydrides such as pyromellitic anhydride, trimellitic anhydride, phthalic anhydride, and succinic anhydride, hexahydrophthalic anhydride, and maleic anhydride; aromatic diamines such as paraphenylenediamine, metaphenylene diamine, 4-4'-diaminodiphenylmethane, 4-4'-diaminodiphenyl sulfone, 4-4'-diaminodiphenyl ether; imidazole and dihydrazide.

As mentioned above, the co-reactants for hyperbranched polymers of this invention are selected based on the end groups they possess. For example, if the end-groups are either hydroxy or carboxy groups, then the co-reactants suitable for the corresponding polyester resins may be used. If the end-groups are epoxy, then the co-reactants suitable for epoxy resins are used. Similarly, the co-reactants for acrylic resins are selected based on the nature of the end groups they possess.

The powder coatings of the present invention additionally may contain a degasser. Any material that can function as a degasser can be used. For example, a commonly used degasser which is effective in this invention is benzoin.

The powder coatings of this invention additionally may contain flow and leveling agents, also referred to as flow aids, or flow control agents. The flow and leveling agents are used in order to enhance the surface appearance of cured coatings of the powder coating compositions. Various flow and leveling agents known in the art may be used in this invention, which typically comprise acrylic polymers. Examples of flow and leveling agents, without limitation, include dry flow agents, such as silica (e.g., fumed silica sold under the tradename of "CAB-O-SIL M-5"), and alumina; flow agents, such as butyl acrylate homopolymer, and 2-ethylhexyl acrylate copolymers. As the commercial products therefor, for example, "MODAREZ MFP" a trademark of SYNTHRON; "MODAFLOW" a trademark of Monsanto Co.; and "ACRONAL" a trademark of BASF may be used. Other flow and leveling agents which may be used include EX 486 available from Troy Chemical, BYK 360P available from BYK-Chemie, and PERENOL F-30-P available from Henkel.

It is preferable that the hyperbranched polymers of this invention exhibit glass temperatures ($T_g$) in the range of from about 35° C. to 150° C. If $T_g$ is lower than 35° C., the powder coating composition tends to agglomerate to form solid grains and causes blocking. If $T_g$ is higher than 150° C., the smoothness of the resulting coating film will tend to be inferior. The $T_g$ of the other polymeric resin binders, if employed, should also be preferably in this same temperature range in order to obtain the best results. It is also preferable that the hyperbranched polymers of this invention exhibit number average molecular weight of at least about 1200.

The hyperbranched polymer of this invention is prepared by the condensation of one or more of self-condensable monomers of the formula:

$$A_m-R_1-B_n$$

wherein:
(i) $R_1$ is a linear or branched aliphatic or aralkyl moiety having 1 to 10 carbon atoms having a valence of m+n;
(ii) A is either hydroxy or amino group;
(iii) B is carboxyl group; and (iv) m and n are integers from 1 to 5, with the proviso that:
(a) when m>1, n=1;
(b) when n>1, m=1; and
(c) the sum of m and n is from 3 to 6.

Accordingly, the types of self-condensable monomers that are suitable in this invention are those which have the following generic formulae:

| Formula | Class of Molecules |
|---|---|
| A—R$_1$—B$_2$ | Monohydroxy dicarboxylic acids |
| | Monoamino dicarboxylic acids |
| A—R$_1$—B$_3$ | Monohydroxy tricarboxylic acids |
| | Monoamino tricarboxylic acids |
| A—R$_1$—B$_4$ | Monohydroxy tetracarboxylic acids |
| | Monoamino tetracarboxylic acids |
| A—R$_1$—B$_5$ | Monohydroxy pentacarboxylic acids |
| | Monoamino pentacarboxylic acids |
| A$_2$—R$_1$—B | Dihydroxy carboxylic acids |
| | Diamino carboxylic acids |
| | Hydroxy-amino-carboxylic acids |
| A$_3$—R$_1$—B | Trihydroxy carboxylic acids, |
| | Combinations of trifunctional hydroxy-amino carboxylic acids, |
| and | |
| | Triamino carboxylic acids |
| A$_4$—R$_1$—B | Tetrahydroxy carboxylic acids, |
| | Combinations of tetrafunctional hydroxy-amino carboxylic acids, |
| and | |
| | Tetra-amino carboxylic acids |
| A$_5$—R$_1$—B | Penta-hudroxy carboxylic acids, |
| | Combinations of penta-functional hydroxy-amino carboxylic acids; |
| and | |
| | Penta-amino carboxylic acids |

Representative examples of linear or branched alkyl groups having 1 to 10 carbon atoms include derivatives of methyl, ethyl, propyl, butyl, pentyl, hexyl, cyclohexyl, heptyl, cycloheptyl, octyl, ethyl-cyclohexyl, nonyl, propyl-cyclohexyl, and decanyl. As noted, the valence of these alkyl groups should match the total number of substituents, i.e., the total number of A and B groups present in them. For example, a suitable monohydroxy dicarboxylic acid is α-hydroxy malonic acid, where R$_1$ is methyl group having a valence of 3

(i.e., 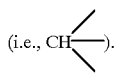).

Similarly, suitable examples of linear or branched aralkyl groups having 1 to 10 carbon atoms include derivatives of phenylmethyl, phenylethyl, phenylpropyl, phenylbutyl, phenyldimethyl, phenyldiethyl, and phenylmethylpropyl. Thus, a suitable self-condensable monomer having an aralkyl moiety, for example, is α-hydroxy-α-phenyl malonic acid.

In one of the preferred embodiments, the self-condensable monomers used in the preparation of hyperbranched polymers of this invention are aliphatic. Examples of suitable aliphatic self-condensable monomers include, without limitation, α,α-bis-(hydroxymethyl)-acetic acid, α,α-bis-(hydroxymethyl)-propionic acid,
α,α-bis-(hydroxymethyl)-butyric acid, α,α-bis-(hydroxymethyl)-valeric acid,
α,α,α-tris-(hydroxymethyl)-acetic acid, α,β-dihydroxypropionic acid,
α-hydroxy-malonic acid, malic acid, citric acid, tris-(carboxymethyl)-methanol, arabonic acid, galactonic acid, gluconic acid, aspartic acid, and glutamic acid.

It is believed that the self condensable monomers of this invention as described herein self condense to form the hyperbranched polymeric molecules (macromolecules) having a "tree" like structure. Illustratively, the structures of these "tree" like macromolecules may be pictorially depicted as shown below, using for example either A—R$_1$—B$_2$ or A$_2$—R$_1$—B as the self condensable monomers. The hyperbranched polymers formed therefrom are designated as A—HYP—(B)$_x$ or B—HYP—(A)$_x$, where x is the number of respective end-groups present therein and HYP represents the hyperbranched polymer having a degree of polymerization from about 15 to 250. The position at which the polycondensation begins and the branching occurs to form the "tree" like structure is called as the focal point. Thus, in these structures below, A is the focal point for structure A—HYP—(B)$_x$ and B is the focal point for structure B—HYP—(A)$_x$.

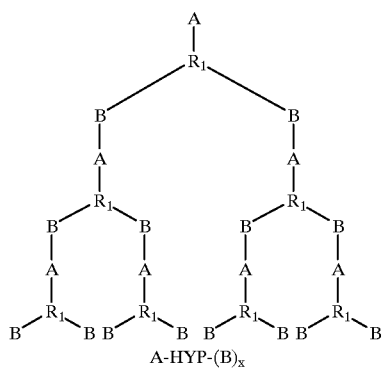

A-HYP-(B)$_x$

-continued

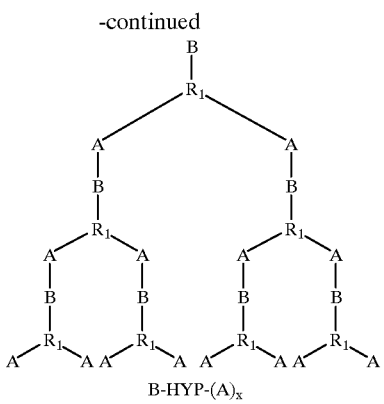

B-HYP-(A)$_x$

The hyperbranched polymers of this invention are preferably further chain extended at the focal point using one or more of multivalent monomeric chain linkers of the formula:

$$R_2-D_z$$

The chain linkers suitable for this purpose are those which can bond to the A or B focal point functional groups such that the resulting chain extended hyperbranched polymer has the formula:

[HYP—A—D]$_y$—R$_2$—D$_{z-y}$, when m=1; or

[HYP—B—D]$_y$—R$_2$—D$_{z-y}$, when n=1 depending upon the type of reaction involved between the chain linker and the hyperbranched polymer. In this structure, HYP is a hyperbranched polymer having a degree of polymerization of from about 15 to 250 as described hereinabove. $R_2$ is a linear or branched aliphatic, aralkyl, or aromatic moiety having 1 to 12 carbon atoms having a valence of z. D is selected from the group consisting of hydroxy, amino, epoxy, and carboxy groups. y and z are integers having a value from 2 to 4.

The same aliphatic or aralkyl moiety as defined hereinabove may be used as $R_2$ moiety provided that the valence is satisfied. Suitable examples of aromatic moieties that can be used as $R_2$ include but not limited to phenylene, biphenylene, naphthalene, triphenylmethane, triphenylethane, and a biphenyl derivative of the formula:

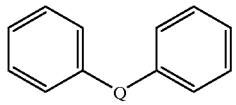

wherein Q is selected from the group consisting of —O—, —S—, —SO$_2$—, —SO—, —CO—, an alkylene group containing 1 to 4 carbon atoms, and an alkylidene group containing 1 to 4 carbon atoms. The functional groups, D may be substituted on these aromatic moieties in any order.

Suitable functional groups that may be used as the chain linkers of this invention include without limitation diols, triols, tetraols, dicarboxylic acids, tricarboxylic acids, tetracarboxylic acids, diamines, triamines, tetraamines, di-, tri-, and tetraamides, aminoalcohols, mono-, di-, and triepoxides.

Accordingly, representative examples of chain linkers may be selected from the group consisting of ethylene glycol, 1-2-propanediol, 1-3-propanediol, 1-3-butanediol, 1-4-butanediol, 1-5-pentanediol, 1-6-hexanediol, dimethylol propane, neopentyl glycol, cyclohexane dimethanol, 1-4-xylylene glycol, pentaerythritol, trimethylolpropane, trimethylolethane, tris-(4-hydroxyphenyl)ethane, oxalic acid, malonic acid, succinic acid, glutaric acid, adipic acid, trimesic acid, ethylene oxide, propylene oxide, ethanolamine, 1-amino-2-propanol, 1-amino-3-propanol, 1-amino-4-butanol, ethylene diamine, 1,2-propylene diamine, hexamethylene diamine, 1,3-propylene diamine, triglycidyl isocyanurate, and hexamethoxymethyl melamine.

In another preferred embodiment of this invention the hyperbranched polymer of this invention is suitably end-capped. In this embodiment, both chain extended and the unchain extended hyperbranched polymers can be end-capped. The end-capping is affected by a variety of groups well-known in the art using any of the well-known methods known in the art. For instance, suitable end-capping moieties may be selected from the group consisting of monofunctional alcohols, epoxides, carboxylic acids, carboxylic acid chlorides, carboxylic anhydrides, vinyl ethers, amines, isocyanates, and silanes.

Representative examples of specific end-capping moieties include but not limited to methanol, ethanol, n- or iso-propanol, n-, iso-, or tert-butanol, phenol, allyl alcohol, p-hydroxyphenyl methyl carbinol, p-hydroxybenzyl alcohol, acetic acid, acetic anhydride, acetyl chloride, valeric acid, heptanoic acid, octanoic acid, stearic acid, lauric acid, oleic acid, eleostearic acid, benzoic acid, acrylic acid, methacrylic acid, maleic anhydride, glycidyl acrylate, glycidyl methacrylate, butadiene monoepoxide, ethyl vinyl ether, methyl vinyl ether, chloroethyl vinyl ether, epihalohydrin, methyl amine, ethyl amine, n-propyl amine, aniline, methyl isocyanate, phenyl isocyanate, and chlorodimethoxy-methylsilane.

In yet another embodiment of this invention the end-capping moieties (groups) and thus the powder coating compositions containing them can be cured by any of the normal actinic radiation curing methods. The radiation can be ionizing radiation (either particulate or non-particulate) or non-ionizing radiation. As a suitable source of particulate radiation, one can use any source which emits electrons or charged nuclei (e.g., e-beam). Particulate radiation can be generated by electron accelerators, such as the Vander Graff accelerator, resinous transformers, linear accelerators, insulating core transformers, radioactive elements, such as cobalt 60, strontium 90, and the like. As a suitable source of non-particulate non-ionizing radiation, any source which emits radiation in the range of from about $10^{-3}$ angstroms to 2000 angstroms can be used. Examples of which include vacuum ultraviolet (UV) lamps, such as xenon or krypton arcs. As a suitable source of non-ionizing radiation, any source which emits radiation from 2000 angstroms to 4000 angstroms can be used. Suitable sources include mercury arcs, carbon arcs, tungsten filament lamps, sun lamps, and lasers. All of these devices and sources are well-known in the art and those skilled in radiation technology are fully aware of the manner in which radiation is generated and the precautions to be taken in its use. Particularly useful and preferred radiation sources for this invention are UV and e-beam sources as described hereinabove.

When the powder coating compositions are to be cured by UV radiation, suitable photoinitiators may be added to such compositions. Suitable photoinitiators which are well-known in the art include 2,2-diethoxyacetophenone, 2,3, or 4-bromoacetophenone, benzaldehyde, benzoin, benzophenone, 9,10-dibromoantharacene, 4,4'-dichlorobenzophenone, 2,3-pentanedione, hydroxycyclohexyl phenyl ketone and xanthone. Photoactivators can also be used in combination with the photoinitiators. Examples of photoactivators are methylamine, tributylamine, 2-aminoethylethanolamine, cyclohexylamine, diphenylamine, and tribenzylamine.

In an additional aspect of one of the preferred embodiments, the hyperbranched polymer of this invention may include one or more of functional moieties. The term functional moiety used herein is intended to mean a group or moiety which is chemically bonded to the polymer and can bring about some functional property to the polymer. Examples of such functional moieties include crosslinkers, UV and light stabilizers, surface property modifiers, biocides, and the like.

Suitable examples of crosslinkers include hydroxy, carboxy and amino groups. Examples of UV and light stabilizing moieties include benzotriazole, piperizyl, and piperidyl moieties. These moieties may be bonded to self-condensable monomers, chain linkers, or the end-capping moieties as described hereinabove, preferably these moieties are bonded to the end-capping moieties. A representative example of such an end-capping moiety, I is shown below.

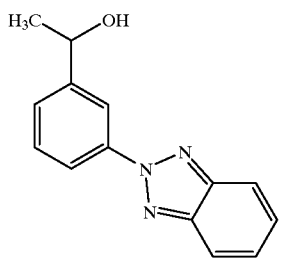

I

Examples of surface property modifiers include a wide variety of silicon and fluoroalkyl containing molecules which are bonded to self-condensable monomers, chain linkers or the end-capping moieties as described hereinabove. Examples of biocides include organotin pigments, copolymers of organotin esters of methacrylic acid with conventional acrylates, tributyl tin oxide, and the like.

In another preferred embodiment of this invention, the hyperbranched polymer suitable for forming the powder coatings is preferably a polyester. In accordance with this preferred embodiment, the powder coating composition is comprised of an intimate blend in a finely divided form of:
(a) from about 40 to 95 percent by weight of a polymeric binder including a mixture of:
 (i) from about 10 to 100 percent by weight, based on the weight of said binder, of a hyperbranched polyester formed from one or more of self-condensable monomers and having at least two reactive terminal functional groups; and
 (ii) from about 0 to 90 percent by weight, based on the weight of said binder, of an epoxy, polyester, blocked urethane resin, or an acrylic resin;
(b) from about 5 to 40 percent by weight of a co-reactant capable of reacting with the reactive functionality on said polymeric binder (a) selected from the group consisting of blocked aliphatic diisocyanates, blocked aromatic diisocyanates, triglycidyl isocyanurate, dicarboxylic acid anhydrides, dicyanadiamide and its derivatives and mixtures thereof;
(c) from about 0.2 to 2 percent by weight of a degasser; and
(d) from about 0.2 to 2 percent by weight of a flow and leveling agent.

The hyperbranched polyesters of this embodiment have a number average molecular weight of at least 1200 and a glass transition temperature ($T_g$) of from about 35° C. to about 150° C. The hyperbranched polyesters of this embodiment preferably have a degree of branching of at least 50 percent and $T_g$ of from about 40 to 80° C. The degree of branching is determined by the extent of polymerization of all of the polymerizable groups in the self-condensable monomers. The degree of branching can readily be measured by a number of techniques well-known in the art. For instance, NMR technique can be used to measure the degree of branching. A detailed description of the measurement of degree of branching may be found in Hult et al, *Macromolecules,* 1995, 28, 1698–1703; incorporated herein by reference in its entirety.

The other polymeric binder components, such as polyester, epoxy, blocked urethanes, or acrylic resins are the same materials as described hereinabove. The same co-reactants, degasser, and flow and leveling agents as described herein may be used in this embodiment.

The preferred hyperbranched polyesters of this embodiment may be prepared by the condensation of one or more of self-condensable monomers selected from the group consisting of:
(a) HO—$R_3$—(COOH)$_3$;
(b) (HO)$_3$—$R_3$—COOH;
(c) HO—$R_4$—(COOH)$_2$;
(d) (HO)$_2$—$R_4$—COOH;
and mixtures thereof; wherein $R_3$ and $R_4$ are independently selected from the group consisting of:
 linear or branched alkyl and fluoroalkyl groups having the formula $C_nH_xF_y$, where for $R_3$, n is an integer from 1 to 10, x and y are integers from 0 to 2n-2, and the sum of x and y is 2n-2, and for $R_4$, n is an integer from 1 to 10, x and y are integers from 0 to 2n-1, and the sum of x and y is 2n-1;
 an alicyclic group having 5 to 20 carbon atoms and having a valence of 4 for $R_3$ and a valence of 3 for $R_4$; and
 linear or branched alkenyl and fluoroalkenyl groups having the formula $C_nH_xF_y$, where for $R_3$, n is an integer from 1 to 10, x and y are integers from 0 to 2n-4, and the sum of x and y is 2n-4, and for $R_4$, n is an integer from 1 to 10, x and y are integers from 0 to 2n-3, and the sum of x and y is 2n-3.

Preferably, the hyperbranched polyesters of this embodiment are prepared by the condensation of self-condensable monomers selected from the group consisting of
 α,α-bis-(hydroxymethyl)-acetic acid, α,α-bis-(hydroxymethyl)-propionic acid,
 α,α-bis-(hydroxymethyl)-butyric acid, α,α-bis-(hydroxymethyl)-valeric acid,
 α,α,α-tris-(hydroxymethyl)-acetic acid, α,β-dihydroxypropionic acid,
 α-hydroxy-malonic acid, malic acid, citric acid, and tris-(carboxymethyl)-methanol.

The hyperbranched polyester can further be chain extended and end-capped using suitable chain linkers and end-capping moieties as described hereinabove. The chain extension and end-capping reactions are described in more detail below.

The preferred hyperbranched polyester is either hydroxy terminated or carboxy terminated. It is also referred to as "hydroxyl-functional" or "carboxyl-functional" polyesters in the prior art. For a hydroxyl-terminated polyester, the preferred hydroxyl number is from about 15 to about 400; and, for a carboxyl terminated polyester, the preferred carboxyl number is from about 15 to about 400. Typically, hydroxyl terminated hyperbranched polyester will have a high hydroxyl number and low carboxyl number, and vice versa.

The powder coatings of this invention further comprises at least one additional ingredient selected from the group consisting of catalysts, fillers, coloring agents, corrosion inhibitors, biocides, plasticizers, hindered amine light stabilizers and UV light absorbers. The amounts of these additional ingredients employed depend upon the intended result from the use of such additional ingredients. Accordingly, these additional ingredients in an amount within a range not to obstruct the material properties of the coating film may be used.

The catalysts used with the powder coatings composition is generally for the curing reaction, and may include, for example, imidazole compounds and phosphorus-containing compounds. Examples of imidazole compounds are 2-methylimidazole, 2-isopropylimidazole, 2-heptadecylimidazole, 2-undecylimidazole, and 2-phenyl-4,5-dihydroxymethyl-imidazole. As the commercial product therefor, for example, "CURESOLE $C_{17Z}$" a trademark of Shikoku Chemical Corp. may be enumerated. As the phosphorus containing compounds, for example, triphenylphosphine, tri(nonylphenyl) phosphine, and triethylphosphine may be enumerated. Other examples include choline chloride, commercial product therefor, "Actiron CC-6" a trademark of Synthron, Inc. may be used; carboxylic acid salts of tin, such as stannous octoate, dibutyltin dilaurate, dibutyltin diacetate, examples of commercial products therefor include "Actiron SNO-30" and "Actiron DBT," both trademarks of Synthron, Inc., and the like; and the metal salts of acetylacetonates, sold under the tradename "Acetylacetonates" by The Shepherd Chemical Group may be used.

In a further aspect of this invention a process for the production of powder coating compositions is also provided. The process of this invention includes the steps of:
(a) subjecting one or more of self-condensable monomers to polycondensation reaction conditions for a sufficient period of time and under suitable conditions of temperature and pressure, and optionally adding one or more of chain linkers and end-capping moieties to said polycondensation reaction to form the corresponding hyperbranched polymer;
(b) melt blending said hyperbranched polymer in the presence of:
  (i) an epoxy, polyester, blocked urethane resin, or an acrylic resin;
  (ii) a co-reactant capable of reacting with said hyperbranched polymer, epoxy, polyester or acrylic resin;
  (iii) optionally one or more of additional ingredients selected from the group consisting of degassers, flow and leveling agents, catalysts, fillers, coloring agents, corrosion inhibitors, biocides, plasticizers, hindered amine light stabilizers and UV light absorbers; for a sufficient period of time and under suitable conditions of temperature and pressure to form the corresponding powder coating composition in the form of flakes; and
(c) grinding and sieving of said flakes to form the powder coating compositions.

The preferred hyperbranched polymers of the process of this invention are hyperbranched polyesters described herein which are prepared by the condensation of self-condensable monomers described hereinabove. The polycondensation reaction, the first step of the process of this invention, may be carried out by any of the conventional methods which is described in more detail below.

In the second step of the process of this invention, the hyperbranched polymer is melt blended with other ingredients described herein. Preferably, the ingredients of the powder coating composition may be dry blended and then melt blended in an extruder at a temperature in the range of from about 50° C. to about 180° C., flaked and finally ground and sieved in the final step. During extrusion, the extrudate is taken over a parallel squeezed and chilled rolls to control the size of the flakes. Caution should be exercised in the melt blending step (i.e., step b) such that the blending is carried out at a temperature sufficiently low to prevent any unblocking of the crosslinking groups in the co-reactant molecule. For example, unblocking of the blocked isocyanate must be avoided in this step in order to avoid premature crosslinking.

In the final step, the grinding of the particles is carried out in the temperature range of from about 10° C. to about 30° C. It is critical that the grinding step be carried out at a constant temperature. It is preferable that the grinding be carried out using a suitable coolant such as liquid nitrogen in order to maintain constant temperature during grinding. If the temperature during grinding falls below 10° C., the powder may absorb moisture, and if the temperature goes above 30° C., then the powder will agglomerate and may cake, therefore, it is critical that the grinding is carried out at constant temperature. In addition, it has been found that the constant temperature grinding results in powder coatings having a narrow particle distribution, and as a result, the sieving step may sometimes be skipped. The sieving is done in such a fashion that the average particle size is in the range of from about 1 to 300 microns, preferably in the range of from about 10 to 100 microns.

In yet an additional aspect of this invention it has been found that the hyperbranched polymers described herein are also suitable either as polymeric co-reactants (i.e., crosslinking molecules) or as flow and leveling agents as described herein. In accordance with this aspect of the present invention, a powder coating composition is provided which is comprising of an intimate blend in a finely divided form of:
(a) a polymeric binder selected from the group consisting of epoxy, polyester, blocked urethane and acrylic polymers having a reactive functionality selected from the group consisting of epoxy, carboxy, and hydroxy functionalities and mixtures thereof; and
(b) a hyperbranched polymeric co-reactant having reactive groups selected from the group consisting of hydroxy, carboxy, amides, epoxy, blocked isocyanates, dicarboxylic acid anhydrides, dicyanadiamide, and mixtures thereof, wherein said reactive groups are capable of reacting with the reactive functionality on said polymeric binder (a).

Accordingly, the hyperbranched polymer described herein may be used as such in this aspect of the invention. Additionally, the polymeric binders consisting of polyester resin, epoxy, or acrylic resin are the same as described hereinabove. Preferably, the hyperbranched polymers of this invention are end-capped with reactive functional groups. The end-capping may be carried out either on the chain extended polymer or the unchain extended polymer as described hereinbelow. Furthermore, these powder coating compositions may also contain additional ingredients such as degassers, flow and leveling agents, catalysts, fillers, etc. as described hereinabove.

Suitable reactive end-capping moieties (groups) that may be used are, for example, epihalohydrins, cyclic carboxylic acid anhydrides, phenolics, blocked isocyanates, acrylic, allylic, and vinyl compounds, and haloalkyldialkoxysilanes. Specific examples of such molecules include but not limited to epichlorohydrin, epibromohydrin, maleic anhydride, phthalic anhydride, trimellitic anhydride, p-hydroxyphenyl methyl carbinol, p-hydroxybenzyl alcohol, eleostearic acid, acrylic acid, methacrylic acid, acryloyl chloride, methacryloyl chloride, cinnamic acid, glycidyl acrylate, glycidyl methacrylate, hydroxyethyl acrylate, hydroxyethyl methacrylate, allyl alcohol, allyl chloride, allyl amine, vinyl ethyl ether, chloroethyl vinyl ether, butadiene monoepoxide, monoblocked isophorone diisocyanate, monoblocked toluene diisocyanate, chlorodimethoxy-methylsilane, and 1 -cyanoguanidine.

The ratio of the reactive hyperbranched polymer as a co-reactant and the polymeric binder may range from about 5:95 to from about 40:60, preferably in the range of from about 15:85 to 35:65.

When the hyperbranched polymer is used as a flow and leveling agent, it may be present in an amount in the range of from about 0.2 to 5 percent by weight based on the total weight of the powder coating composition. In one of the preferred embodiments the hyperbranched polymer used as a flow and leveling agent is a polyester as described hereinabove. The hyperbranched polymers for this purpose may or may not contain reactive groups, and may have reactive end-groups as described hereinabove.

The hyperbranched polymers used in this embodiment may also act as adhesion promoter. It is believed that depending upon the type of polymeric binder employed, the hyperbranched polymer may change the surface properties and/or surface tension of the powder coatings and thus enhance the adhesion of the polymeric binder to the applied surface. In general, it has been now found that epoxy end-capped hyperbranched polymers of the present invention are particularly suitable as adhesion promoters for acrylic and polyester containing powder coatings.

The powder coating compositions containing the reactive hyperbranched polymers of this invention may be prepared using the procedures of the process for the preparation of other powder coatings as described above. However, desirable amounts of materials are employed within the scope of this invention as described herein.

In yet another facet of this invention, it has also been found that two classes of hyperbranched polymers described herein are novel. In accordance with this aspect of the invention, there is provided a first class of hyperbranched polymers, which are prepared by the condensation of two or more of self-condensable monomers of the formula:

$$A_m\text{—}R_1\text{—}B_n$$

wherein $R_1$, A, B, m and n are as defined above. Preferably the novel polymers of this invention have a number average molecular weight of at least 1200 and a glass transition temperature ($T_g$) of from about 35° C. to about 150° C., and more preferably, 50 to 80° C. In addition, the preferred hyperbranched polymers are prepared from aliphatic self-condensable monomers as described hereinabove.

When the hyperbranched polymers are copolymers, i.e., the polymer formed from two self-condensable monomers, the copolymer may be formed from such two monomers in the mole ratio in the range of from about 1:99 to 99:1. It is preferred that the comonomers of the same kind be used for making the copolymers, i.e., a desirable copolymer is made from two monomers having the general formula either A—$R_1$—BN or $A_m$—$R_1$—B. Thus, for example, copolymers of two different monohydroxy-polycarboxylic acids, such as citric acid and malic acid; or two different polyhydroxy-monocarboxylic acid, such as α,α-bis-(hydroxymethyl)-propionic acid and α,α-bis-(hydroxymethyl)-propionic acid can be made.

When the copolymers are made with two different kinds of monomers, i.e., one selected from the general formula A—$R_1$—$B_n$, and the other selected from the general formula $A_m$—$R_1$—B, then it is preferred that one of the monomers is present in less than 10 mole percent, preferably less than 5 mole percent, to avoid gelling of the copolymer.

The copolymers or the polymers having more than two self-condensable monomers may be random or block polymers. The random copolymers may be made by condensation of a mixture of monomers. The block copolymers can be made by first making the homopolymers; and subsequent reaction between two or more of homopolymers results in a block copolymer as illustrated in Scheme 1.

Scheme 1

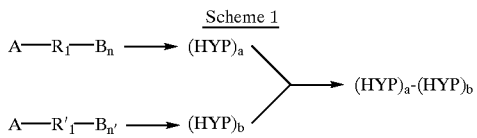

In Scheme 1, A—$R_1$—$B_n$, and A—$R'_1$—$B_{n'}$ are either monohydroxy or monoamino-polycarboxylic self-condensable monomers described hereinabove. $R_1$ and $R'_1$ may be the same or different and are linear or branched aliphatic or aralkyl groups as defined above. n and n' are integers ranging from 2 to 5 and may be the same or different. $HYP_a$ and $HYP_b$ denotes the hyperbranched polymers formed therefrom.

Preferably the copolymers are further end-capped with a suitable end-capping group. The end-capping may be done using a variety of reactive and unreactive end-capping moieties as described herein. As mentioned above, the type of end-capping depends on the final intended use of the polymer. For example, if the copolymer is used as a co-reactant in powder coating compositions, then it is preferred that the copolymer is end-capped with reactive end-capping groups as described herein.

A second class of novel hyperbranched polymers of this invention are made by the chain extension of the homopolymers of self-condensable monomers as described herein. These chain extended hyperbranched polymers are prepared by a convergent polycondensation of:

(a) one or more of self-condensable monomers of the formula:

$$A_m\text{—}R_1\text{—}B_n; \text{ and}$$

(b) one or more of multivalent monomeric chain linkers of the formula:

$$R_2\text{—}D_z$$

The chain linkers react with the terminal A or B functional groups of the homo-hyperbranched polymer, thus resulting in a polymer having the formula:

(HYP-13 A—D)$_y$—$R_2$—$D_{z-y}$, when m=1, or (HYP—B—D)$_y$—$R_2$—$D_{z-y}$ when n=1.

In these structures, $R_1$, $R_2$, A, B, D, m, n, x, y, and z are as defined above, HYP denotes the hyperbranched polymer formed from the corresponding self-condensable monomer. The convergent synthesis enables the accurate control and design of the macromolecular structure of the hyperbranched polymer. Although prior art refers mostly to the "divergent" approaches, there are few prior art references to convergent approaches. For instance, convergent synthesis may be found in U.S. Pat. No. 5,041,516 incorporated herein by reference in its entirety.

The self-condensable monomer, and the chain linkers referred to in this convergent polycondensation are the same as described hereinabove. The preferred chain extended hyperbranched polymers have a number average molecular weight of at least 1200 and a glass transition temperature ($T_g$) of from about 35° C. to about 150° C., and more preferably, 50 to 80° C. These hyperbranched polymers are further end-capped using reactive or unreactive end-capping moieties as described herein.

The preferred hyperbranched polymers are polyesters having either hydroxyl or carboxyl terminated groups. The hydroxyl number of hydroxy terminated polyester may range from about 15 to 400, and the carboxyl number of carboxyl-terminated polyester may range from about 15 to 400. As stated earlier, if a polymer has a high hydroxyl number, then it has a low carboxyl number and vice versa.

These novel hyperbranched polymers are useful in a number of applications in addition to the powder coating compositions described herein. For instance, the hyperbranched polymers of the present invention can be used as ingredients in clearcoats, high-solids coatings, solvent-borne coatings, adhesives, and may also be used as rheology modifiers and as additives in plastics.

In a further aspect of this invention a novel process for the preparation of the hyperbranched polymers is also provided. The process of the present invention is comprised of the following steps:

(a) subjecting one or more of self-condensable monomers to polycondensation reaction conditions in an inert diluent medium and atmosphere for a sufficient period of time and under suitable conditions of temperature and pressure to form the corresponding hyperbranched polymer;

(b) optionally reacting said hyperbranched polymer from (a) with one or more of chain linkers for a sufficient period of time and under suitable conditions of temperature and pressure to form the corresponding chain extended hyperbranched polymer; and (c) optionally reacting said hyperbranched polymer from step (a) or said chain extended hyperbranched polymer from step (b) with an end-capping moiety for a sufficient period of time and under suitable conditions of temperature and pressure to form the corresponding hyperbranched polymer.

As described herein, the process of the present invention may be illustrated as shown in Scheme 2 below:

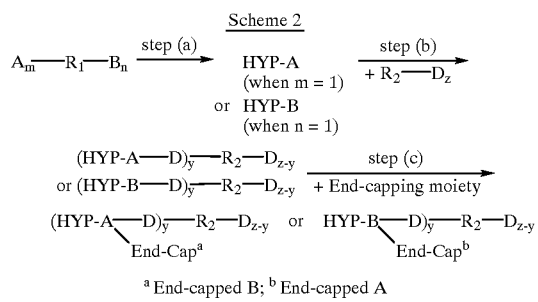

In Scheme 2, steps (a) through (c) correspond to those steps (a) through (c) mentioned herein. A wide variety of well-known methods can be used in step (a), i.e., the polycondensation reaction. For instance, the carboxylic acid (s) group in the starting self-condensable monomer reacts either with the hydroxyl or amino group under suitable polycondensation conditions to form the hyperbranched polymer. The carboxyl group may suitably be converted to form an acid halide, such as chloride or bromide, which will react instantly in situ with the hydroxy or amino groups to form the hyperbranched polymer. Similarly, the carboxyl group may be converted to alkyl ester group, which subsequently reacts with the hydroxy or amino group under well-known transesterification conditions to form the hyperbranched polymer.

However, surprisingly, it has now been found that the polycondensation step, i.e., step (a) of the process of the present invention can be carried out in an inert diluent medium and in an inert atmosphere simply by the reaction of the free carboxylic acid group with a hydroxy or an amino group. A wide variety of inert diluents may be used in this step. The purpose of these diluents is to disperse uniformly the self-condensable monomers during polycondensation. The diluent in some cases acts both as a dispersant and a solvent. Any diluent which does not interfere with the polycondensation reaction and aids to disperse/dissolve the monomers of this invention may be used as an inert diluent.

Suitable diluents may be inorganic or organic compounds, which exist mostly as liquids at the process temperature of the present invention. Such diluents which assist in achieving the objects of the present invention include, without limitation, water, mineral oil, white oil, technical oil, and silicone oil. More specifically, such diluents may be selected from the group consisting of water, aliphatic hydrocarbon mixtures having a boiling point in the range of 190 to 350° C., aromatic hydrocarbons having a boiling point in the range of 190 to 350° C., and isomeric diphenyl ethers; as a commercial product therefor "ISOPAR L" may be used.

Other suitable diluents include halogenated diphenyl ethers, diphenyl sulfone, benzophenone, polyphenyl ethers such as tri and tetraphenyl ether, terphenyl, tetraphenyl, halogenated biphenyl, and the like. Other suitable diluents also include a class of poly(fluorinated alkylene oxide) having repeating units of the formula:

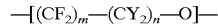

wherein m is an integer from 1 to 10, n is an integer from 0 to 5, Y is the same or different and represents hydrogen or halogen including F, Cl, or Br. The poly(fluorinated alkylene oxide) can be either a straight or branched chain structure.

These and other suitable diluents are disclosed in U.S. Pat. No. 3,948,856 and in Ind. Eng. Chem. Prod. Res. Dev., Vol. 20, No. 2, 1981; both of which are incorporated herein by reference in their entirety. The preferred diluents in the process of the present invention are water and "ISOPAR L".

As stated herein, advantageously and surprisingly, it has now been found that water is one of the most effective diluents/dispersants for the polycondensation of self-condensable monomers in step (a) of the process of the present invention. In addition, the polycondensation, chain extension, and end-capping in steps (a) through (c) of the process of the present invention is best carried out in an inert atmosphere. Suitable inert atmosphere include but not limited to nitrogen and any of the inert gases of Group VIII A of the periodic table, which include helium and argon.

The temperature at which step (a) is conducted ranges from about −10° C. to about 250° C., preferably from about 60° C. to about 200° C. The pressure in this step may be atmospheric or slowly reduced from atmospheric to subatmospheric at the end of the polycondensation reaction. When the polycondensation is carried out at atmospheric pressure, the polymeric product formed is generally of lower molecular weight. If higher molecular weight polymer is desired then, preferably, vacuum of about 1 mbar to about 0.1 mbar is applied at the end of the polycondensation reaction, which aids in the formation of high molecular weight polymer.

The reaction time in step (a) will generally range from about 15 minutes to about 8 hours or longer. Preferably the reaction is carried out for a period of about 1 to 3 hours.

The step (a), i.e., the polycondensation reaction can be carried out either in a continuous or semi-continuos process conditions. Any of the well-known methods for carrying out the polycondensation in a continuous or semi-continuous fashion may be used for the preparation of hyperbranched polymers of the present invention. For instance, as a semi-continuous process, the first stage of polycondensation may be carried out in a batch reactor as mentioned herein, and the final polycondensation is carried out in a continuous manner employing a wiped film reactor. Alternatively, a wiped film reactor followed by a vented extrusion reactor may be employed for the continuous operation. A detailed description of such processes may be found in U.S. Pat. No. 4,490,519; incorporated herein by reference in its entirety.

The polycondensation reaction, i.e., step (a) of the process of the present invention may be carried out with or without any catalysts. However, in some cases it is preferable to carry out the polycondensation reaction in the presence of a suitable acid, base or metal catalyst. Any acid, base or metal catalyst that will function as a catalyst for the polycondensation conditions may be used in this step (a) of the process of the present invention. Specific examples of such esterification reactions may be found in U.S. Pat. Nos. 4,745,213 and 5,243,069; incorporated herein by reference in their entirety.

The suitable acid includes, without limitation, mineral acids such as HCl and $H_2SO_4$; super acids such as hydrofluoric acid, fluorosulfonic acid; organic sulfonic acids such as p-toluene sulfonic acid, methane sulfonic acid, and trifluoromethane sulfonic acid, pyridinium p-toluenesulfonate; other inorganic acids such as phosphoric acid, and boric acid; carboxylic acids such as trifluoroacetic acid; Lewis acids such as $BF_3$, $AlCl_3$, $SbF_5$, and the like; and solid acid catalysts such as silica, zeolites, and the like. The suitable base includes an inorganic base such as a metal hydroxide, preferably an alkali metal hydroxide, an alkali metal carbonate, e.g., $K_2CO_3$; an alkali metal alkoxide (an ionic organic base), such as $NaOCH_3$, $KOC(CH_3)_3$, etc.; an alkali metal organic salt (an ionic organic base) such as potassium acetate, etc.; and an amine (a non-ionic organic base) such as pyridine, or a tri-lower-alkylamine, e.g., tripropylamine, trimethylamine, triethylamine, an hindered base such as 2,4-diazabicyclo[2,2,2]octane, etc. Ammonia can also be used as a base in step (a) of the process of the present invention.

Illustrative examples of metal catalysts that are particularly suitable in the transesterification/condensation type reactions (i.e., reaction of alkyl esters of carboxylic acids with alcohols) include derivatives of Group I metals, derivatives of Group IVA metals, derivatives of Group IVB metals, derivatives of manganese and cobalt, and mixtures thereof. These may be preferably lithium acetate, sodium acetate, potassium acetate, cesium acetate, stannic acid, butylstannoic acid, stannous octanoate, dibutyltin oxide, tin butoxide, dibutyltin diesters, di-n-butyl tin dilaurate, titanium tetrabutoxide, titanium propoxide, titanium phenoxide, zirconium butoxide, silicon phenoxide, manganese acetate, cobalt acetate, and mixtures thereof.

The amount of the catalyst employed depends upon the nature of the polycondensation reaction and the catalyst. Any amount of catalyst that would be sufficient to carry out the desired polycondensation reaction may be used and may range from about 30 parts per million to one to two moles of catalyst per mole of the starting self-condensable monomer(s) used as shown in Schemes 2 or 3.

The preferred catalysts for the polycondensation reaction has been found to be acid catalysts selected from the group consisting of sulfuric acid, hydrochloric acid, methanesulfonic acid, p-toluenesulfonic acid, and pyridinium p-toluenesulfonate. More preferably, sulfonic acid catalysts, such as methanesulfonic acid, p-toluenesulfonic acid, and pyridinium p-toluenesulfonate are found to be effective catalysts.

The steps (b) and (c), i.e., the chain extension and end-capping steps can be carried out in the same pot in a single operation after the formation of the hyperbranched polymer or can be carried out separately in subsequent steps. The hyperbranched polymer may also be end-capped without chain extension by skipping step (b). A typical process involving the preparation of unchain extended and end-capped hyperbranched polymer is shown in Scheme 3.

Scheme 3

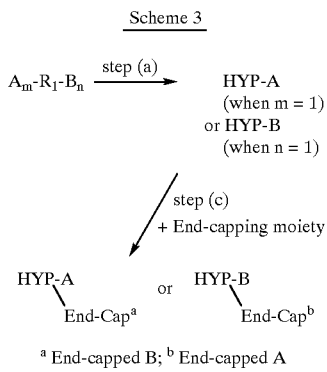

[a] End-capped B; [b] End-capped A

In Scheme 3, steps (a) and (c) correspond to the steps (a) and (c) of the process of the present invention mentioned herein. The temperatures at which steps (b) and (c) are conducted are generally at around the same final temperature used for step (a), which is around 200° C. to 250° C. The pressure in these steps may be atmospheric or slowly reduced from atmospheric to subatmospheric pressures as described for step (a) herein. The reaction times in steps (b) and (c) will generally range from 15 minutes to 3 hours or longer and under an inert atmosphere, such as nitrogen as described herein.

Using the procedures of steps (a) through (c) outlined herein, the hyperbranched polymer may be formed, which features high degree of branching and number average molecular weight of at least 1200 as described hereinabove. The degree of branching generally ranges from about 50 percent to about 90 percent as measured by NMR spectroscopy, and preferably, the degree of branching is at least 50 percent. The hyperbranched polymers formed as outlined herein generally exhibit very low color and are often water white transparent polymers. Thus, these polymers are particularly useful in a wide variety of applications including clearcoats and adhesives where low color polymers are highly desirable.

The self-condensable monomers, chain linkers, reactive or unreactive end-capping moieties described in the process of the present invention are the same molecules as described herein. Any suitable combinations of these molecules can be used to meet the objectives of the desired application for the end product, i.e., the hyperbranched polymer.

Illustratively, the chain extension reaction in step (b) using a variety of chain linkers are depicted in Equations (1) through (4). In Equation (1), a hyperbranched polymer derived from a monohydroxy polycarboxylic acid is reacted with a dicarboxylic acid chain linker to form the chain extended hyperbranched polymer.

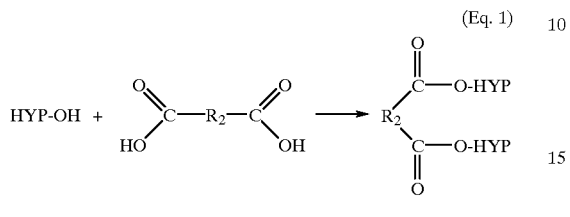
(Eq. 1)

Equation 2 illustrates the reaction of hyperbranched polymer of this invention with a tris functional chain linker. In this instance, the hyperbranched polymer is formed from a polyhydroxy or polyamino monocarboxylic acid monomer, i.e., B=carboxy group, n=1, A=hydroxy or amino group, and m=2 to 5.

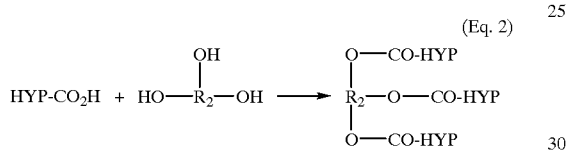
(Eq. 2)

A partially chain linked hyperbranched polymer with a tetra functional chain linker is illustratively shown in Equation 3.

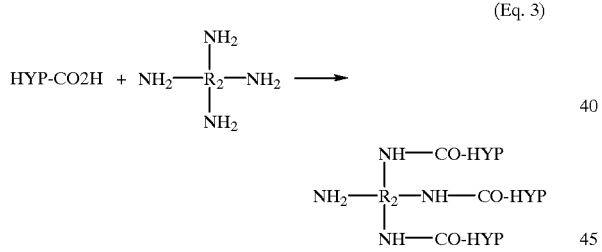
(Eq. 3)

Similarly, the chain extension of the hyperbranched polymers may also be carried out using epoxy chain linkers as shown in Equation 4.

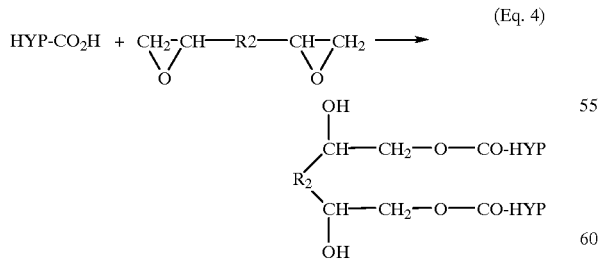
(Eq. 4)

Similarly, representative examples of end-capping reactions are illustratively shown in Equations 5 through 9. The Equations 5 and 6 show examples of end-capping with unreactive groups, whereas Equations 7 to 9 show end-capping with a variety of reactive end-capping groups as described herein. In these equations, the hyperbranched polymer is represented by having x number of end-groups, because the number of end-groups depends upon the degree of branching as well as degree of polymerization.

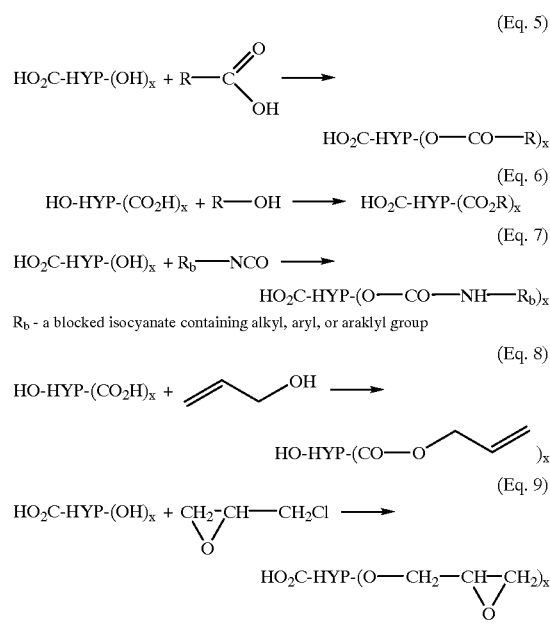

$R_b$ - a blocked isocyanate containing alkyl, aryl, or araklyl group

Particularly useful hyperbranched polymers that can be made by the process of the present invention include but not limited to copolyester of α,α-bis-(hydroxymethyl)-propionic acid and α,α,α-tris-(hydroxymethyl)-acetic acid;

copolyester of α,α-bis-(hydroxymethyl)-propionic acid and α,α,α-tris-(hydroxymethyl)-acetic acid, which is end-capped with methacrylic acid;

poly-α,α-bis-(hydroxymethyl)-propionic acid-hexamethylene diamide; glycidyl end-capped poly-α,α-bis-(hydroxymethyl)-propionic acid; and glycidyl end-capped poly-α,α-bis-(hydroxymethyl)-propionic acid-hexamethylene diamide. All of these hyperbranched polymers exhibit degree of branching of at least 50 percent and glass transition temperature ($T_g$) of from about 35 to about 150° C., preferably in the range of from about 50 to about 80° C.

The powder coating compositions of this invention may be deposited on various metallic and non-metallic (for example, wood, plastics including thermoplastics, thermosets, and composites, and the like) substrates by known techniques for powder deposition such as by means of a powder gun, by electrostatic deposition or by deposition from a fluidized bed. Details of such deposition techniques may be found in U.S. Pat. No. 5,554,701; and in *User's Guide to Powder Coating*, 2nd Ed., Emery Miller, editor, Society of Manufacturing Engineers, Dearborn, (1987); both of which references are incorporated herein by reference in their entirety.

The powder coating compositions of this invention feature low viscosities and thus can be formed into thin films and can be cured at lower temperatures to form smooth surfaces. Additionally, these films are hard and exhibit enhanced impact resistance properties than the conventional polyester resins. Thus, these powder coating compositions find utilities in automotive, packaging, and appliances.

In a further aspect of this invention an adhesive composition comprising a hyperbranched polymer is also provided.

The hyperbranched polymers suitable for adhesive compositions are those which are described hereinabove. Accordingly, the hyperbranched polymers are formed from self-condensable monomers and having terminal reactive functional groups. The self condensable monomers suitable for fonning the hyperbranched polymers have the formula:

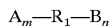

$$A_m\text{—}R_1\text{—}B_n$$

wherein A, B, $R_1$, m and n are as defined above. The preferred hyperbranched polymer is aliphatic as described hereinabove and exhibits similar molecular weight and glass transition properties as specified herein. A number of self condensable monomers described herein may be used to prepare the hyperbranched polymer suitable as adhesive. The polymer may further be chain extended and/or end-capped. The preferred monomer for adhesive formulation is α,α-bis-(hydroxymethyl)-propionic acid.

As used herein, adhesive is intended to mean a material capable of holding together two solid materials by means of surface attachment. Surprisingly, it has now been found that hyperbranched polymers of this invention are capable of holding two similar or dissimilar surfaces by the formation of strong adhesion bond between the two surfaces. The surfaces that can be bonded together using the adhesive formulation of this invention include wood, plastic, glass, metal, and paper.

The adhesive composition may optionally contain minor amounts, and usually about 20% or less, of other art recognized additional ingredients for the purposes of modifying the properties of the composition. Such additional ingredients, without limitation, include tackifiers, diluents, plasticizers, fillers, hardeners, oils, waxes, viscosity modifiers, rosin, colorants, cross-linking agents, stabilizers, rubbers, antioxidants, and mixtures thereof.

It has also been found that the hyperbranched polymers of this invention may be tailored in such a way that it may be used as hot melt adhesive, pressure sensitive adhesive, radiation curable adhesive, and in two-pack adhesive compositions.

Advantageously and unexpectedly, it has now been found that hyperbranched polymers of this invention by themselves are very effective hot melt adhesives. For example, poly-(α,α-bis-(hydroxymethyl)-propionic acid) is found to be effective as hot melt adhesive in bonding two sections of wood, metal (such as aluminum), plastic (e.g., polycarbonate), and glass. The bonding is affected by pouring the hot molten polymer between the surfaces and holding them together while cooling of the molten polymer.

As mentioned above, often addition of minor amounts of other components such as, for example, plasticizers, tackifiers, antioxidants, fillers, and waxes improve the properties of the hot melt adhesives. For example, flexibilizers or plasticizers are added in order to improve both the mechanical shock resistance and the thermal properties of the adhesive. Suitable examples of plasticizers include polybutenes, phthalates, and tricresyl phosphate. Examples of antioxidants include, without limitation, hindered phenols. Wax alters surface characteristics by decreasing both the liquid adhesive's surface tension and its viscosity in the melt. Upon solidification, however, the wax acts to increase the strength of the adhesive. Both paraffin and microcrystalline wax may be used.

A pressure sensitive adhesive as used herein is intended to refer to a class of materials which adhere to surfaces with no more than applied finger pressure, are aggressively and permanently tacky. Thus, pressure sensitive adhesives need no activation other than the finger pressure, exerts a strong holding force, and may be removable from a smooth surface without leaving a residue.

It has now been found that hyperbranched polyesters end-capped with suitable end-capping groups as described herein exhibit excellent tacky properties thus finding use as pressure sensitive adhesives. Particularly preferred polymer for this application is poly-(α,α-bis-(hydroxymethyl)-propionic acid) end-capped with acetic anhydride. The pressure sensitive adhesive composition may again contain one or more of additional ingredients as minor components in order to improve overall properties of the adhesive. Such minor components include, without limitation, elastomeric polymers, fillers, antioxidants, stabilizers, and cross-linking agents.

Suitable elastomeric polymers include India rubber, gum of southern pine, balsam of Peru, and ground litharge. Other elastomers which are suitable in pressure sensitive adhesive compositions include butyl rubbers, poly(vinyl ethers), acrylics (especially those having long chain alkyl groups), and silicones. The pressure sensitive adhesives of this invention may be applied neat or out of suitable solvent, or as water-based emulsions. Suitable solvents include acetone, methyl ethyl ketone, and tetrahydrofuran.

A radiation curable adhesive is one which can be cured by suitable actinic radiation source. Any of the actinic radiation sources as described hereinabove may be used for this purpose. It has now been found that ultraviolet light generated by a mercury lamp is particularly effective in curing various adhesive compositions formed from the hyperbranched polymers of this invention. A particularly suitable hyperbranched polymers for this purpose are those which are end-capped with a suitable radiation curable functional group.

Suitable radiation curable end-capping groups may be selected from the group consisting of maleic anhydride, eleostearic acid, acrylic acid, methacrylic acid, acryloyl chloride, methacryloyl chloride, cinnamic acid, glycidyl acrylate, glycidyl methacrylate, hydroxyethyl acrylate, hydroxyethyl methacrylate, allyl alcohol, allyl chloride, allyl amine, vinyl ethyl ether, chloroethyl vinyl ether, and butadiene monoepoxide. A particularly preferred hyperbranched polymer for radiation curable adhesive is polyester, poly-(α,α-bis-(hydroxymethyl)-propionic acid) end-capped with maleic anhydride.

The hyperbranched polymers of the present invention are also useful in two-pack adhesives. In this formulation, the first pack contains a hyperbranched polymer, preferably a polyester formed from one or more of self condensable monomers and having reactive terminal groups. The second pack contains a crosslinker capable of reacting with the reactive flimtionality on the hyperbranched polymer, preferably a polyester contained in the first pack. The reactive groups on the crosslinker may be selected from the group consisting of amine hardener, blocked aliphatic diisocyanates, blocked aromatic diisocyanates, triglycidyl isocyanurate, dicarboxylic acid anhydrides, dicyanadiamide and its derivatives and mixtures thereof.

As mentioned hereinabove, the crosslinkers are selected depending upon the type of hyperbranched polymer employed in a two-pack adhesive formulation. For instance, if the hyperbranched polymer is end-capped with an epoxy group, then the preferred crosslinker in the second pack is an amine hardener. The amine hardener acts as a curing agent for the epoxy end-capped hyperbranched polymer, common examples of such amine hardeners are polyamides, available under the tradename Versamid. These polyamides are the reaction products of dimer acids and aliphatic diamines such as diethylenetriamine, $C_4H_{13}N_3$. Other room temperature curing agents are triethylenetetraamine, $C_6H_{18}N_4$, and the propylene glycol diamines, known as Jeffamines.

The blocked aliphatic or aromatic diisocyanates or the diisocyanate prepolymer may be used as the second pack when the hyperbranched polymer has hydroxy or amino end-groups. For instance, poly-($\alpha,\alpha$-bis-(hydroxymethyl)-propionic acid) in the first pack and $\epsilon$-caprolactam blocked isophorone isocyanate in the second pack is found to be particularly effective two-pack adhesive formulation.

As described herein, the amounts of hyperbranched polymer and the crosslinker employed depends upon the nature of the reactive groups present in them. Any suitable amounts of these two constituents that is required to bring about the desired curing reaction may be employed in a two-pack adhesive formulation. In general, the amounts of the hyperbranched polyester ranges from about 40 to about 70 weight percent and amounts of the crosslinker ranges from about 30 to about 60 weight percent based on the total weight of the adhesive composition.

Once the adhesive composition is formulated as described herein, it may be used by any of the art recognized methods to apply it onto the desired surfaces. For instance, a hot melt adhesive may be used merely by heating it to its softening temperature and coating it between the two surfaces to be adhered, with subsequent cooling. Heating may take place in commercially available hot melt glue guns or another suitable apparatus. Preferred softening temperatures range from about 35° C. to about 150° C. A more preferred temperature is from about 40° C. to about 120° C., and most preferably from about 50° C. to about 80° C. The temperature is not critical as long as it is below the decomposition temperature of the composition, and may be adapted by the skilled artisan by varying the melt components.

Coating of the substrate (i.e., the surfaces to be adhered) can be accomplished by the usual processing methods, such as, for example, casting, knife-coating, or spraying from the melt, solution, or emulsion and then immediately pressing on the other surface that is to be bonded, or it can be done in two working steps by additional heat sealing of the joint areas under pressure. In the latter case, both hot melt and pressure sensitive adhesives of the invention may also be placed in the form of strand or film between the two surfaces which are to be bonded. As stated hereinabove, pressure sensitive or radiation curable adhesives may be applied either in solution or in water-based emulsions.

This invention is further illustrated by the following examples which are provided for illustration purposes and in no way limit the scope of the present invention.

EXAMPLES (GENERAL)

In the Examples that follow, the following abbreviations are used:
DMPA—$\alpha,\alpha$-Bis-(hydroxymethyl)-propionic acid.
THPE—Tris-(4-hydroxyphenyl)ethane.
MSA—Methanesulfonic acid.
p—TSA—Para-Toluenesulfonic acid
Py—TSA—Pyridinium para-toluenesulfonate
Isopar L—Aliphatic hydrocarbon mixture with a boiling range around 195° C.
DMSO—Dimethylsulfoxide.
NAD Process—Non-aqueous dispersion process.
$T_g$—Glass transition temperature (mid point value).
$T_m$—Melting point (peak value).
$T_d$—Decomposition onset.
$M_w$—Weight average molecular weight.
NMR—Nuclear magnetic resonance spectroscopy, usually of either proton,$^1$H; and/or carbon 13, $^{13}$C nuclei.
DSC—Differential Scanning Calorimetry.
TGA—Thermogravimetric Analysis.
GPC—Gel Permeation Chromatography.

General Analytical Techniques Used for the Characterization: A variety of analytical techniques were used to characterize the hyperbranched polymers of this invention and the powder coating formulations formed therefrom, which included the following:

Carboxyl number of the hyperbranched polyesters was determined in accordance with ASTM procedure no. D-1639-90.

Hydroxyl number of the hyperbranched polyesters was determined in accordance with ASTM procedure no. D-1957-86.

NMR: $^1$H and $^{13}$C NMR spectra were recorded on a Bruker 400 MHz spectrometer with 5 mm probes at 400 and 100 MHz, respectively. The observed peaks were designated as follows: s—singlet; br—broad; m—multiplet; bm—broad multiplet;

DSC: A Perkin Elmer 7700 DSC was used to determine the $T_g$ (mid point value) and/or $T_m$ of the hyperbranched polymers and/or the films formed from the powder coating compositions. The heating rate was maintained at 10° C./minute, generally, over a temperature range of –25° C. to 300° C. The flow rate of nitrogen or air is maintained at 20 mL/min.

TGA: A Thermal Analysis 910 TGA was used to determine the thermal decomposition onset ($T_d$) of the hyperbranched polymers. The heating rate was maintained at 10° C./minute, generally, over a temperature range of –25° C. to 400° C. The flow rate of nitrogen or air is maintained at 20 mL/min.

Impact Resistance of the cured films formed from the powder coatings of this invention was measured in accordance with ASTM D-2794.

Flexibility measurements of the cured films formed from the powder coatings of this invention were made in accordance with ASTM D-522.

Pencil and Scratch Hardness of the cured films formed from the powder coatings of this invention was measured in accordance with ASTM D-3363-74.

Initial Gloss at 60° of the cured films formed from the powder coatings of this invention was measured in accordance with ASTM D-523.

Adhesion of the cured films formed from the powder coatings of this invention was measured in accordance with ASTM D-3359.

Solvent Resistance—MEK Test: Solvent resistance of the cured films formed from the powder coatings of this invention was measured using methyl ethyl ketone (MEK) double-rubs test. The number of rubs necessary to penetrate through the coating to the panel was determined as follows. The head of a sixteen ounce ball peen hammer was surrounded with cheese cloth and then soaked with 100% MEK. The ball peen hammer was then stroked across the panel going against the grain. MEK resistance is reported as the number of double strokes required to expose the bare panels. This test was performed a minimum of four times for each formulation and the averages reported.

Example 1

Preparation of Poly-DMPA Hyperbranched Polymer Powder by AND Process

A 1 liter reactor equipped with a high speed stirrer, 4 baffles, a thermometer, a nitrogen inlet and a Dean Stark trap attached to a condenser was charged with 300 grams of DMPA, 300 grams of Isopar L, and 0.3 grams of p-toluene sulfonic acid. The mixture was heated to 160° C. with stirring by immersing the reactor into a preheated salt bath, and 6 grams of Antaron V 220 was added which resulted in an uniform dispersion of DMPA in Isopar. The salt bath temperature was then raised to around 242° C. The water begun to distill when the reactor temperature reached 164° C. The reaction was then run for additional 5 hours and the mixture was cooled to room temperature. The polymer was isolated by filtration. Residual Isopar L was removed by washing the powder four times with 600 mL of iso-hexane. The fine white powder was then dried at room temperature under vacuum; yield 157 grams. The carboxyl number of the polymer was found to be 40 and the hydroxyl number was 400.

Example 2 (Comparative)
Preparation of Poly-DMPA Hyperbranched Polymer by a Batch Process Example 2 is a repeat of Example 10 of U.S. Pat. No. 5,567,795. A 500 mL round bottom 1-necked flask equipped with a RE111 Rotary Evaporator was charged with DMPA (10.33 grams, 0.077 moles) under a blanket of nitrogen/argon. The flask was rotated in an oil bath at a slow speed, approximately 1 rotation per second, with heating. The solid DMPA melted to a clear liquid in approximately 25 minutes at 200° C. After 13 minutes of heating at 200° C., vacuum (~3.25 mm Hg) was applied for 1.3 hours and water was distilled off. The clear pale yellow solid was cooled under vacuum to ambient temperature. Starting monomer was removed from the neck of the flask and THF (~100 mL) was added to the clear glassy solid. After standing overnight, additional white starting monomer was removed. The THF was removed under reduced pressure to give a clear semi-solid (5.6 g.). GPC $M_w$=1768 Daltons, polydispersity=1.6; TGA—$T_d$~270° C.; DSC—$T_g$~70° C. $^1$H NMR (400 MHz, $d_6$-DMSO) δ 11.65 (s), 4.9 (br), 4.59 (br), 4.06 (m), 3.47 (m), 1.14 (s), 1.06 (s), 1.05 (s), 1.01 (s). $^{13}$C NMR (100 MHz, $d_6$-DMSO) δ 174.3 (m), 173.1 (m), 63.88 (bm), 50.25–45.64 (m), 16.87 (m).

Example 3
Preparation of Poly-DMPA Hyperbranched Polymer by an Aqueous Dispersion Process A 500 mL round bottom flask equipped with a short path distillation head, overhead mechanical stirrer and a glass sparging tube was charged with DMPA (200 grams), methanesulfonic acid (MSA, 0.46 grams), and deionized (DI) water (200 grams). The solution was allowed to stir to form a slurry. The flask was then lowered into a silicone oil bath and the bath was heated to 160° C. Once the oil bath temperature reached 140° C. the water began to distill. The solution was sparged at an initial nitrogen flow rate of about 0.5 standard cubic feet/hour (SCFH), which was subsequently increased to about 1.5 SCFH as the reaction temperature reached 160° C. The sparging was stopped when the amount of distillate reached approximately 220 mL. The molten polymeric material in the flask was poured onto a sheet of aluminum foil while it was still hot. The clear water white polymer was then cooled at ambient temperature overnight, the foil was peeled off the polymer and crushed into a fine powder; yield 175 grams. The polymer was characterized by GPC, TGA, DSC, and NMR; the results are as follows:

GPC-$M_w$=2558, polydispersity=1.2;
Residual Monomer—0.42 weight percent;
TGA—$T_d$, 365° C.;
DSC—$T_g$, ~60° C.;
$^1$H NMR—(d6-DMSO)-13 (s),4.63 (br. s), 4.09–4.02 (br. m), 3.47–3.38 (br. m), 1.16 (s), 1.11 (s), 1.01 (s);
$^{13}$C NMR—(d6-DMSO)-176.66–171.84 (m), 65.55, 65.11, 63.79, 50.28, 48.36, 46.29, 40.13, 17.03.

Examples 4–6

Example 3 was substantially repeated in Examples 4–6 with the exception that the catalysts used and the amounts of catalyst used were as specified below:

| Example No. | Catalyst | Amount (grams) |
|---|---|---|
| Example 4 | p-Toluene Sulfonic Acid | 0.46 |
| Example 5 | Pyridinium p-toluene sulfonate | 0.46 |
| Example 6 | No Catalyst | — |

The polymeric product isolated in Examples 4–6 were characterized by GC, GPC, TGA, DSC, and NMR; the results are as follows:

|  | Example 4 | Example 5 | Example 6 |
|---|---|---|---|
| Yield of Polymer, g | 173 | 175 | 168 |
| Residual Monomer | 0.62 wt % | 1.35 wt % | 1.91 wt % |
| GPC—$M_w$ | 3258 | 2194 | 2615 |
| TGA—$T_d$°C. | 367 | 365 | 363 |
| DSC—$T_g$,°C. | ~60 | ~60 | ~60 |
| $^1$H NMR | Same as observed in Example 3. | | |
| $^{13}$C NMR | Same as observed in Example 3 | | |

Example 7
Preparation of Copoly-DMPA/Citric Acid Hyperbranched Polymer by an Aqueous Dispersion Process Example 3 was substantially repeated in Example 7 except for the amounts of materials used as specified below:

| DMPA | 200 g |
|---|---|
| Citric Acid | 20 g |
| Water | 200 g |
| MSA | 0.46 g |

The copolymer gelled.

Examples 8–12

Various copolymers containing two self-condensable monomers as disclosed herein are prepared substantially following the procedure as set forth in Example 7. The specific copolymers are set forth in Table 1. Each of these polymers are highly branched and are suitable in a wide variety of applications disclosed herein including as a polymeric binder in powder coating formulations.

TABLE 1

| Example No. | Self-condensable Monomers | Comments* 1 | 2 | 3 |
|---|---|---|---|---|
| 8 | DMPA/Aspartic Acid | + | + | + |
| 9 | Citric Acid/Aspartic Acid | + | + | + |
| 10 | DMPA/α,α,α-tris-(hydroxymethyl)-acetic acid | + | + | + |
| 11 | DMPA/α,α-bis-(hydroxymethyl)-butyric acid | + | + | + |
| 12 | α,β-dihydroxypropionic acid/citric acid | + | + | + |

*1. Suitable as polymeric binder in powder coatings; 2. Suitable as flow and leveling agent in powder coatings; 3. Suitable in adhesives formulations.

Example 13
Preparation of Poly-DMPA-Hexamethylene Diamide

Example 13 illustrates the preparation of chain extended hyperbranched polymers of this invention. Example 3 was substantially repeated to form poly-DMPA using 200 grams of DMPA. When the amount of distillate reached about 220 mL, the poly-DMPA had an acid number of about 10. At this time, hexamethylene diamine (8.35 grams, 72 mmols) was added to the polymer melt and the reaction temperature was maintained at 160° C. for an additional period of about 30 minutes during which time the hexamethylene diamide of poly-DMPA was formed. The chain linked polymer was then isolated by pouring the polymer melt over an aluminum foil and allowing to cool at ambient temperature overnight; yield 180 grams. The product was characterized by TGA, DSC, GPC, and NMR.

Examples 14–18

Various chain linked polymers containing self-condensable monomers and chain linkers as disclosed herein are prepared substantially following the procedure as set forth in Example 13. The specific chain linked polymers are set forth in Table 2. Each of these polymers are chain linked highly branched polymers and are suitable in a wide variety of applications disclosed herein including as a polymeric binder in powder coating formulations.

TABLE 2

| Example No. | Self-condensable Monomers/ Chain linkers | Comments* | | |
|---|---|---|---|---|
| | | 1 | 2 | 3 |
| 14 | DMPA/THPE Triacetate | + | + | + |
| 15 | Citric Acid/Glutaric Acid | + | + | + |
| 16 | Aspartic Acid/Adipoyl Dichloride | + | + | + |
| 17 | α,α-bis-(hydroxymethyl)-butyric acid/Propylene Oxide | + | + | + |
| 18 | Malic Acid/Succinoyl Dichloride | + | + | + |

*1. Suitable as polymeric binder in powder coatings; 2. Suitable as flow and leveling agent in powder coatings; 3. Suitable in adhesives formulations.

Example 19
Preparation of Poly-DMPA End-capped with Methacrylic Acid

Example 19 illustrates the preparation of end-capped hyperbranched polymers of this invention. Example 3 was substantially repeated with the exception of the modifications as specified below. When about 220 mL of water had distilled, 4.0 grams of methacrylic acid was added to the polymer melt. The stirring of the reaction mixture was continued maintaining the temperature at 160° C. for an additional period of about 60 minutes. The reaction was stopped at this time and the polymer melt was poured over a sheet of aluminum foil and allowed to cool overnight; yield of the polymer was 178 grams. The polymer was characterized by NMR.

Examples 20–21
Preparation of Poly-DMPA End-capped with Maleic Anhydride

Example 19 was substantially repeated with the exception that the maleic anhydride was used as the end-capping moiety in the amounts as specified below:

| Amount of Maleic Anhydride | |
|---|---|
| Example 20 | 3.5 grams |
| Example 21 | 8.75 grams |

The product in Example 20 was isolated in accordance with procedures as set forth in Example 19. The product in Example 20 was characterized by NMR. The product in Example 21 gelled before it could be poured over an aluminum foil.

Example 22
Preparation of Poly-DMPA End-capped with Methacrylic Acid

In this Example, Poly-DMPA was first prepared following the procedures as set forth in Example 3. About 200 grams of poly-DMPA was then placed in a flask equipped with a short path distillation head, overhead mechanical stirrer and a glass sparging tube. The flask was then heated to about 120 to 160° C. by immersing in a preheated oil bath. Methacrylic acid (4 grams) was introduced into the flask, and the polymer melt was sparged with nitrogen to remove the water formed from the reaction of methacrylic acid with the hydroxyl end groups. The sparging was stopped when all of the water was removed (about 60 minutes). The molten polymeric material in the flask was poured onto a sheet of aluminum foil while it was still hot. The clear water white polymer was then cooled at ambient temperature overnight; the foil was peeled off the polymer and the polymer was crushed into a fine powder; yield 203 grams. The polymer was characterized by NMR, which indicated the formation of methacrylic end groups.

Example 23
Preparation of Poly-DMPA End-capped with Acetate

Example 22 was substantially repeated in Example 23 with the exception of using acetic anhydride as the end-capping moiety as specified below. About 200 grams of poly-DMPA was placed in a flask equipped with a short path distillation head, overhead mechanical stirrer and a glass sparging tube. The flask was then heated to about 120 to 160° C. by immersing in a preheated oil bath. Acetic anhydride (15 grams) was introduced into the flask, and the polymer melt was sparged with nitrogen to remove the acetic acid formed from the reaction of acetic anhydride with the hydroxyl end groups. The sparging was stopped when all of the acetic acid was removed (about 30 minutes). The molten polymeric material in the flask was poured onto a sheet of aluminum foil while it was still hot. The clear polymer was then cooled at ambient temperature overnight to yield a tacky polymer; yield 205 grams. The polymer was characterized by NMR, which indicated the formation of acetate end groups.

Example 24
Preparation of Poly-DMPA-Hexamethylene Diamide End-Capped with Methacrylic Acid Example 24 illustrates the preparation of chain extended (or chain linked) and end-capped hyperbranched polymer of this invention. Example 13 was substantially repeated with the exception of the modifications as set forth below. When the amount of distillate reached about 220 mL, the poly-DMPA had an acid number of about 10. At this time, hexamethylene diamine (8.35 grams, 72 mmols) was added to the polymer melt and the reaction temperature was maintained at 160° C. for an additional period of about 30 minutes during which time the hexamethylene diamide of poly-DMPA was formed. To this chain extended polymer 4.0 grams methacrylic acid was added and the reaction was continued for an additional period of 30 minutes. The chain extended (linked) and end-capped polymer was then isolated by pouring the polymer melt over an aluminum foil and allowing it to cool at ambient temperature overnight; yield 183 grams. The product was characterized by TGA, DSC, GPC, and NMR.

Examples 25–29

Various chain linked and end-capped polymers containing self-condensable monomers, chain linkers, and end-capping moieties as disclosed herein are prepared substantially following the procedure as set forth in Example 24. The specific compositions are set forth in Table 3. Each of these polymers are chain linked, end-capped, and highly branched polymers, and are suitable in a wide variety of applications disclosed herein including as a polymeric binder in powder coating formulations.

TABLE 3

| Example No. | Self-condensable Monomer(s)/ Chain Linkers/ End-Capping Moieties | Comments* | | |
|---|---|---|---|---|
| | | 1 | 2 | 3 |
| 25 | DMPA/Hexamethylene Diamine/Epichlorohydrin | + | + | + |
| 26 | Citric Acid/Glutaric Acid/Allyl Amine | + | + | + |
| 27 | Aspartic Acid/Adipoyl Dichloride/Methanol | + | + | + |
| 28 | α,α-bis-(hydroxymethyl)-butyric acid/Propylene Oxide/Maleic Anhydride | + | + | + |
| 29 | α,α,α-tris(hydroxymethyl)-acetic Acid/Succinoyl Dichloride/Allyl Alcohol | + | + | + |

*1. Suitable as polymeric binder in powder coatings; 2. Suitable as flow and leveling agent in powder coatings; 3. Suitable in adhesives formulations

Examples 30–34

Examples 30–34 illustrate the use of hyperbranched polymers of this invention in powder coatings as a polymeric binder. Powder coating compositions were prepared from the ingredients set forth in Table 4 below. The powder coatings were prepared by premixing the ingredients for about 5 minutes with a Maxi-4000 Vitamixer (ambient temperature) to form a homogeneous dry blend.

TABLE 4

Examples 30–34

| Ingredient | Control 30 | 31 | 32 | 33 | 34 |
|---|---|---|---|---|---|
| Poly-DMPA (from Example 3) | 0 | 40.1 g | 80.2 g | 120.8 g | 160.4 g |
| McWhorter 30-3002[a] | 320.7 g | 120.5 g | 80.2 g | 40.1 g | 0 |
| McWhorter 24-2431[b] | 173.3 g | 86.6 g | 86.7 g | 86.6 g | 86.7 g |
| Benzoin | 2.6 g | 1.3 g | 1.3 g | 1.3 g | 1.2 g |
| Modarez MFP[c] | 3.6 g | 1.8 g | 1.7 g | 1.7 g | 1.7 g |

[a]Hydroxy functional polyester resin from McWhorter Technologies Inc. (hydroxyl equivalent weight 492.5); [b]ε-caprolactam blocked isophorone isocyanate from McWhorter Technologies Inc. (isocyanate equivalent weight 266); [c]a flow modifier from SYNTHRON Co.

The premixed dry blend was then extruded on a ZSK-30 (Werner-Pfleiderer) twin screw extruder (30 mm co-rotating screw design) at the following conditions.

Zone 1=84° C.

Zone 2=110° C.

RPM=100

The percent torque measured during extrusion ranged from 20–50%. The extrudate was cooled to 11° C. through chill rolls at 30 rpm and cut into chips. The cooled chips were pulverized in a Micron Powder Systems micropulverizer hammer mill using liquid nitrogen for constant temperature grinding (10° C.) equipped with a 0.01 inch slotted herringbone screen.

Coatings were applied with an Nordson corona electrostatic spray gun and sprayed onto 3 in.×6 in.×0.02 in. cold rolled, low carbon, mild steel panels (QD36, Q-Panel Inc.). All panels were thoroughly wiped with acetone and then again with methyl ethyl ketone to remove oil, grease, and other impurities prior to powder application. The panels were baked for about 17 minutes at 193° C.

The physical properties of the cured powdered films are listed in Table 5.

TABLE 5

Physical Properties of Cured Powder Films
Examples

| Evaluation Thickness (mils) | Control 30 (1.5–2) | 31 (1.5–2) | 32 (1–1.5) | 33 (0.6–1) | 34 (0.1–0.15) | 34 (1–1.5) |
|---|---|---|---|---|---|---|
| Solvent Resistance - MEK Test (dr) | 316 | 239 | 61 | 141 | 184 | 1000 |
| Impact Resistance | | | | | | |
| Intrusion (in-lbs) | 120 | 40 | 40 | 100 | 160 | 60 |
| Extrusion (in-lbs) | 80 | 20 | 40 | 40 | 160 | 40 |
| Flexibility (mm)[a] | 0 | 0 | 0 | 0 | 0 | 0 |
| Pencil Hardness[b] | F | 6H | 6H | none[e] | none[e] | 6H |
| Scratch Hardness[c] | HB | 5H | 6H | 6H | 6H | 2H |
| Adhesion[d] | 5B | 5B | 5B | 5B | 5B | 5B |
| Initial Gloss 60° | 95 | 85 | 77 | 53 | 58 | 56 |

[a]0 = passes test; [b,c]Pencil and Scratch hardness scale: Softest 6B, 5B, 4B, 3B, B, HB, F, H, 2H, 3H, 4H, 5H, 6H, 7H, 8H, 9H Hardest; [d]5B = best, 0B = worst; [e]did not gauge.

Examples 35–39

Examples 30–34 were substantially repeated in Examples 35–39 with the exception that the powder coating compositions were prepared from the ingredients as set forth in Table 6 below.

TABLE 6

Examples 35–39

| Ingredient | Control 35 | 36 | 37 | 38 | 39 |
|---|---|---|---|---|---|
| Poly-DMPA (from Example 3) | 0 | 50 g | 100 g | 150.2 g | 200 g |
| McWhorter 30-3000[a] | 200.1 g | 150 g | 100.1 g | 50.2 g | 0 |
| McWhorter 24-2431[b] | 46.9 g | 46.9 g | 46.9 g | 46.9 g | 46.9 g |
| Benzoin | 1.3 g | 1.3 g | 1.2 g | 1.3 g | 1.2 g |
| Modarez MFP[c] | 1.8 g | 1.7 g | 1.7 g | 1.8 g | 1.7 g |

[a]Hydroxy functional polyester resin from McWhorter Technologies Inc. (hydroxyl equivalent weight 1135); [b]ε-caprolactam blocked isophorone isocyanate from McWhorter Technologies Inc. (isocyanate equivalent weight 266); [c]a flow modifier from SYNTHRON Co.

The physical properties of the cured powder films from Examples 35–39 are listed in Table 7.

TABLE 7

Physical Properties of Cured Powder Films
Examples

| Evaluation | Control 35 | 36 | 37 | 38 | 39 |
|---|---|---|---|---|---|
| Thickness (mils) | (1.5–2) | (1.5–2) | (0.6–1.2) | (0.6–1.2) | (0.5–1) |
| Solvent Resistance-MEK Test (dr) | 202 | 71 | 49 | 35 | 41 |
| Impact Resistance- | | | | | |
| Intrusion (in-lbs) | 20 | 20 | 20 | 20 | 20 |
| Extrusion (in-lbs) | 20 | 20 | 20 | 20 | 20 |
| Flexibility (mm)[a] | 3 | 1 | 1 | 0 | 0 |
| Pencil Hardness[b] | 4H | 2H | 3H | 5H | 6H |
| Scratch Hardness[c] | 3H | H | 2H | 4H | 6H |
| Adhesion[d] | 5B | 5B | 5B | 5B | 5B |
| Initial Gloss 60° | 91 | 90 | 49 | 53 | 37 |

[a]0 = passes test; [b,c]Pencil and Scratch hardness scale: Softest 6B, 5B, 4B, 3B, B, HB, F, H, 2H, 3H, 4H, 5H, 6H, 7H, 8H, 9H Hardest; [d]5B = best, 0B = worst.

Examples 40–45

Examples 40–45 illustrate the use of hyperbranched polymers of this invention in powder coatings as a flow and leveling agent. Examples 30–34 were substantially repeated in Examples 40–45 with the exception that the powder coating compositions were prepared from the ingredients as set forth in Table 8 below.

TABLE 8

Examples 40–45

| Ingredient | Control 40 | Control 41 | Control 42 | 43 | 44 | 45 |
|---|---|---|---|---|---|---|
| Poly-DMPA (from Example 3) | 0.8 g | 1.6 g | 4.8 g | 0.8 g | 1.6 g | 4.8 |
| McWhorter 30-3002[a] | 159.8 g | 159 g | 155.7 g | 160.9 g | 160.1 g | 156.8 g |
| McWhorter 24-2431[b] | 86.5 g | 86.4 g | 86.4 g | 87.1 g | 87.1 g | 87 g |
| Benzoin | 1.3 g | 1.3 g | 1.3 g | 1.4 g | 1.6 g | 1.6 g |
| Modarez MFP[c] | 1.8 g | 1.8 g | 1.8 g | 0 | 0 | 0 |

[a]Hydroxy functional polyester resin from McWhorter Technologies Inc. (hydroxyl equivalent weight 492.5); [b]ε-caprolactam blocked isophorone isocyanate from McWhorter Technologies Inc. (isocyanate equivalent weight 266); [c]a flow modifier from SYNTHRON Co.

The physical properties of the cured powder films from Examples 40–45 are listed in Table 9.

TABLE 9

Physical Properties of Cured Powder Films
Examples

| Evaluation | Control 40 | Control 41 | Control 42 | 43 | 44 | 45 |
|---|---|---|---|---|---|---|
| Thickness (mils) | (0.8–1.2) | (1.0–1.4) | (1.0–1.3) | (1.0–2.0) | (1.0–2.0) | (1.2–2.0) |
| Solvent Resistance MEK Test (dr) | 109 | 117 | 172 | 111 | 98 | 166 |

TABLE 9-continued

Physical Properties of Cured Powder Films
Examples

| Evaluation<br>Thickness (mils) | Control 40<br>(0.8–1.2) | Control 41<br>(1.0–1.4) | Control 42<br>(1.0–1.3) | 43<br>(1.0–2.0) | 44<br>(1.0–2.0) | 45<br>(1.2–2.0) |
|---|---|---|---|---|---|---|
| Impact Resistance | | | | | | |
| Intrusion (in-lbs) | 140 | 160 | 40 | 160 | 80 | 40 |
| Extrusion (in-lbs) | 120 | 100 | 80 | 160 | 40 | 20 |
| Flexibility (mm)[a] | 0 | 0 | 0 | 0 | 0 | 0 |
| Pencil Hardness[b] | 4H | 4H | 3H | 3H | 6H | 6H |
| Scratch Hardness[c] | F | 2H | HB | F | 2H | H |
| Adhesion[d] | 5B | 5B | 5B | 5B | 5B | 5B |
| Initial Gloss 60° | 78 | 87 | 92 | 76 | 62 | 78 |

[a]0 = passes test; [b,c]Pencil and Scratch hardness scale: Softest 6B, 5B, 4B, 3B, B, HB, F, H, 2H, 3H, 4H, 5H, 6H, 7H, 8H, 9H Hardest; [d]5B = best, 0B = worst.

Examples 46–50

Examples 46–50 illustrate the use of hyperbranched polymers of this invention in powder coatings as a polymer binder in different types of formulations as specified herein. Examples 30–34 were substantially repeated in Examples 46–50 with the exception that the powder coating compositions were prepared from the ingredients as set forth in Table 10 below.

TABLE 10

Examples 46–50

| Ingredient | 46 | 47 | 48 | 49 | 50 |
|---|---|---|---|---|---|
| Poly-DMPA (from Example 3) | 64 g | 64 g | 64 g | 54 g | 82 g |
| Alftalac N-745[a] | — | — | — | 10 g | — |
| McWhorter 24-2431[b] | 35g | 36 g | 34.5 g | 36 g | 18 g |
| Fumed Silica[c] | — | — | 0.5 g | — | — |
| Benzoin | 1 g | — | 1 g | — | — |

[a]Hydroxy functional polyester resin from Vianova Resins (hydroxyl number = 50); [b]ε-caprolactam blocked isophorone isocyanate from McWhorter Technologies Inc. (isocyanate equivalent weight 266); [c]used as a flow and leveling agent, particle size = 0.007 microns.

The formulated powder coatings in Examples 46–50 were ground in a Vita-Mix blender and sieved through a 63 micron sieve. The resulting powder was sprayed onto Q-panels as used in Examples 30–34 using a Tribo gun and cured in an air circulation oven. The panels were cured at 180° C. for 30 minutes. The physical properties of the cured powder films from Examples 46–50 are listed in Table 11.

TABLE 11

Physical Properties of Cured Powder Films
Examples

| Evaluation<br>Thickness (mils) | 46<br>(1.7–3.6) | 47<br>(2–3) | 49<br>(2.2–3) | 50<br>(1.8–2.4) |
|---|---|---|---|---|
| Impact Resistance | | | | |
| Intrusion (in-lbs) | 20 | 20 | 20 | <20 |
| Extrusion (in-lbs) | 20 | 20 | 20 | <20 |
| Pencil Hardness[a] | 5H | 5H | 5H | 5H |

TABLE 11-continued

Physical Properties of Cured Powder Films
Examples

| Evaluation<br>Thickness (mils) | 46<br>(1.7–3.6) | 47<br>(2–3) | 49<br>(2.2–3) | 50<br>(1.8–2.4) |
|---|---|---|---|---|
| Pendulum Hardness[b], sec | 180 | 164 | 175 | 178 |
| Crosshatch Adhesion[c] | 5B | 5B | 5B | 1B |

[a]Pencil and Scratch hardness scale: Softest 6B, 5B, 4B, 3B, B, HB, F, H, 2H, 3H, 4H, 5H, 6H, 7H, 8H, 9H Hardest; [b]Pendulum hardness scale: glass = 250 seconds; [c]Crosshatch adhesion scale: 5B no removal, 4B, 3B, 2B, 1B, 0 total removal.

A few thin coatings were also formed in some of these Examples. The coatings were again cured at 180° C. for 30 minutes and the properties were evaluated. The properties of these films are summarized in Table 12.

TABLE 12

Physical Properties of Cured Powder Films
Examples

| Evaluation<br>Thickness (mils) | 46<br>(1–1.5) | 47<br>(0.8–1) | 50<br>(0.7–1) |
|---|---|---|---|
| Impact Resistance | | | |
| Intrusion (in-lbs) | 20 | 160 | 40 |
| Extrusion (in-lbs) | 20 | 160 | 20 |
| Pencil Hardness[a] | 5H | 5H | 5H |
| Crosshatch Adhesion[b] | 5B | 5B | 1B |
| Taber Abrasion[c] | — | 73 mg/1000 cycles | — |
| Color, b scale | — | 0.3 | — |

[a]Pencil and Scratch hardness scale: Softest 6B, 5B, 4B, 3B, B, HB, F, H, 2H, 3H, 4H, 5H, 6H, 7H, 8H, 9H Hardest; [b]Crosshatch adhesion scale: 5B no removal, 4B, 3B, 2B, 1B, 0 total removal; [c]using a CS 17 wheel and 1 kg weight, performed on a panel cured at 180° C. for 20 minutes.

Example 51

Example 51 illustrates the use of hyperbranched polymers of this invention in clearcoats. The hyperbranched polymer used in Example 51 was a maleic anhydride end-capped poly-DMPA prepared in accordance with the procedures as set forth in Example 22. The end-capped poly-DMPA-maleic anhydride was formed from 132 g of poly-DMPA and 70 g of maleic anhydride in the presence of 1 g of benzoin at 170° C. The polymer melt was allowed to stir for an additional 10 minutes after the addition of maleic anhydride and benzoin. The molten polymer was poured onto aluminum foil. The clear colorless polymer was allowed to cool to room temperature, yield 88%. NMR—$^1$H (d6-DMSO)-7.43 (s), 6.43–6.26 (q), 4.21–4.12 (br. m), 3.48–3.40 (br. m), 1.18 (s), 1.08 (s), 1.02 (s); NMR—$^{13}$C(d6-DMSO)-174.43–171.59, 166.80–164.76, 137.24, 132.40, 130.21, 128.94, 127.67, 65.66, 63.82, 50.36, 48.30, 46.24, 17.5, 16.90. The NMR analysis shows almost complete end-capping with the maleic anhydride as evident from the near disappearance of the terminal $CH_3$ peak at 1.02 ppm and the appearance of the double bond peaks at 6.43–6.26 ppm in the proton NMR.

The end-capped polymer as formed above was self-crosslinked to form a clearcoat as follows. A sample of the above polymer was placed onto a glass plate that was heated to 200° C. The polymer immediately melted and flowed to a clear semi-viscous liquid. After ten minutes a clear, colorless, very hard film was formed by curing of the viscous liquid. The crosslinked film did not flow or yellow after heating it for an additional 30 minutes at 200° C. The end-capped-polymer of Example 51 is used for powder coating clearcoats.

Example 52

Example 52 illustrates the use of hyperbranched polymers of this invention in hot melt adhesives. Hyperbranched poly-DMPA prepared in accordance with Example 3 was melted at 170° C. The molten polymer was laminated between glass sections, wood sections, glass-wood sections and polycarbonate-glass sections. All samples were allowed to cool to room temperature. All of the samples showed very good adhesion. One half inch strips are cut from each one of these samples. The peel strengths are measured after curing, generally, after a period of from about 4 hours to 24 hours. The adhesive bond as measured by the peel strength is high in all cases.

Example 53

Example 53 illustrates the use of hyperbranched polymers of this invention in pressure sensitive adhesive applications. Hyperbranched poly-DMPA end-capped acetate prepared in accordance with Example 23 was melted at 120° C. The molten polymer was laminated between aluminum sections, wood sections, glass sections, and combinations thereof as well as polypropylene sections. All the samples were allowed to cool to room temperature. All samples showed good adhesion. The adhesive bond is measured by peel strength.

Example 54

Example 54 illustrates the use of hyperbranched polymers of this invention in a two pack adhesive applications. 10 g of Hyperbranched poly-DMPA prepared in accordance with Example 3 was melted at 170° C. and mixed with 5 g of McWhorter 24-2431 at that temperature. The mixture is immediately laminated between aluminum sections, wood sections, glass sections, and combinations thereof as well as polypropylene sections and allowed to cool to ambient temperature. Excellent adhesion bond is formed between laminated sections, and the strength of the adhesive bond is measured by peel strength.

Example 55

Example 55 illustrates the use of hyperbranched polymers of this invention in radiation curable adhesives. Hyperbranched poly-DMPA end-capped with maleic anhydride prepared in accordance with Example 20 is dissolved in acetone. The solution is laminated between glass sections, and polypropylene sections. The laminated samples are irradiated with a mercury lamp. Excellent adhesion bond is formed between laminated sections, and the strength of the adhesive bond is measured by peel strength.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A powder coating composition comprising an intimate blend in a finely divided form of:
    (a) from about 60 to 70 percent by weight of a polymeric binder selected from the group consisting of an epoxy, polyester, blocked urethane, or an acrylic resin;
    (b) from about 30 to 40 percent by weight of a co-reactant capable of reacting with the reactive functionality on said polymeric binder (a) selected from the group consisting of blocked aliphatic diisocyanates, blocked aromatic diisocyanates, acid anhydrides, triglycidyl isocyanurate, dicyanadiamide and its derivatives and mixtures thereof;
    (c) from about 0 to 2 percent by weight of a degasser; and
    (d) from about 0.2 to 5 percent by weight of a hyper-branched polyester as a flow and leveling agent or as an adhesion promotor;
    wherein said hyperbranched polyester has a number average molecular weight of at least 1200 and a glass transition temperature ($T_g$) of from about 35° C. to about 170° C.

2. The composition as set forth in claim 1 wherein said hyperbranched polyester is prepared by the condensation of one or more of self condensable monomers selected from the group consisting of:
    (a) HO—$R_3$—(COOH)$_3$;
    (b) (HO)$_3$—$R_3$—COOH;
    (c) HO—$R_4$—(COOH)$_2$;
    (d) (HO)$_2$—$R_4$—COOH;
    and mixtures thereof; wherein $R_3$ and $R_4$ are independently selected from the group consisting of:
    linear or branched alkyl and fluoroalkyl groups having the formula $C_nH_xF_y$, where for $R_3$, n is an integer from 1 to 10, x and y are integers from 0 to 2n-2, and the sum of x and y is 2n-2, and for $R_4$, n is an integer from 1 to 10, x and y are integers from 0 to 2n-1, and the sum of x and y is 2n-1;
    an alicyclic group having 5 to 20 carbon atoms and having a valence of 4 for $R_3$ and a valence of 3 for $R_4$; and
    linear or branched alkenyl and fluoroalkenyl groups having the formula $C_nH_xF_y$, where for $R_3$, n is an integer from 1 to 10, x and y are integers from 0 to 2n-4, and the sum of x and y is 2n-4, and for $R_4$, n is an integer from 1 to 10, x and y are integers from 0 to 2n-3, and the sum of x and y is 2n-3.

3. The composition as set forth in claim 2 wherein said hyperbranched polyester having a degree of branching of at least 50 percent and glass transition temperature ($T_g$) of from about 40 to 80° C.

4. The composition as set forth in claim 2 wherein said self condensable monomers are aliphatic compounds selected from the group consisting of α,α-bis-(hydroxymethyl)-acetic acid, α,α-bis-(hydroxymethyl)-propionic acid, α,α-bis-(hydroxymethyl)-butyric acid, α,α-bis-(hydroxymethyl)-valeric acid, α,α,α-tris-(hydroxymethyl)-acetic acid, α,β-dihydroxypropionic acid, α-hydroxy-malonic acid, malic acid, citric acid, and tris-(carboxymethyl)-methanol.

5. The composition as set forth in claim 2 wherein said hyperbranched polyester is further end-capped with a moiety selected from the group consisting of methanol, ethanol, n- or iso-propanol, n-, iso-, or tert-butanol, phenol, allyl alcohol, p-hydroxyphenyl methyl carbinol, p-hydroxybenzyl alcohol, acetic acid, acetic anhydride, acetyl chloride, valeric acid, heptanoic acid, octanoic acid, stearic acid, lauric acid, oleic acid, eleostearic acid, benzoic acid, acrylic acid, methacrylic acid, maleic anhydride, glycidyl acrylate, glycidyl methacrylate, butadiene monoepoxide, ethyl vinyl ether, methyl vinyl ether, chloroethyl vinyl ether, epihalohydrin, methyl amine, ethyl amine, n-propyl amine, aniline, methyl isocyanate, phenyl isocyanate, and chloro-dimethoxy-methylsilane.

6. The composition as set forth in claim 2 wherein said hyperbranched polyester is a hydroxy terminated hyperbranched polyester having at least two terminal hydroxy groups.

7. The composition as set forth in claim 6 wherein said hydroxy terminated hyperbranched polyester has a hydroxyl number of from about 15 to about 400.

8. The composition as set forth in claim 2 wherein said hyperbranched polyester is a carboxyl terminated hyperbranched polyester having at least two terminal carboxyl groups.

9. The composition as set forth in claim 8 wherein said carboxyl terminated hyperbranched polyester has a carboxyl number of from about 15 to about 400.

10. The composition as set forth in claim 2 wherein said hyperbranched polyester is poly-(α,α-bis-(hydroxymethyl)-propionic acid).

11. The composition as set forth in claim 2 wherein said hyperbranched polyester is further chain extended by chain linkers selected from the group consisting of ethylene glycol, 1-2-propanediol, 1-3-propanediol, 1-3-butanediol, 1-4-butanediol, 1-5-pentanediol, 1-6-hexanediol, dimethylol propane, neopentyl glycol, cyclohexane dimethanol, 1-4-xylylene glycol, pentaerythritol, trimethylolpropane, trimethylolethane, tris-(4-hydroxyphenyl)ethane, oxalic acid, malonic acid, succinic acid, glutaric acid, adipic acid, trimesic acid, ethylene oxide, propylene oxide, ethanolamine, 1-amino-2-propanol, 1-amino-3-propanol, 1-amino-4-butanol, ethylene diamine, 1,2-propylene diamine, hexamethylene diamine, 1,3-propylene diamine, triglycidyl isocyanurate, and hexamethoxymethyl melamine.

12. The composition as set forth in claim 11 wherein said hyperbranched polyester is poly-(α,α-bis-(hydroxymethyl)-propionic acid)-hexamethylene diamide.

13. A powder coating composition comprising an intimate blend in a finely divided form of:

(a) from about 60 to 90 percent by weight of a polymeric binder selected from the group consisting of an epoxy, a polyester, blocked urethane resin, or an acrylic resin;

(b) from about 10 to 40 percent by weight of a hyperbranched polyester having reactive groups selected from the group consisting of hydroxy, carboxy, epoxy, blocked isocyanates, acid anhydrides, dicyanadiamide, and mixtures thereof, wherein said reactive groups are capable of reacting with the reactive functionality on said polymeric binder (a); and (c) from about 0 to 2 percent by weight of a degasser;

wherein said hyperbranched polyester has a number average molecular weight of at least 1200 and a glass transition temperature ($T_g$) of from about 35° C. to about 150° C.

14. The composition as set forth in claim 13 wherein said hyperbranched polyester is prepared by the condensation of one or more of self condensable monomers selected from the group consisting of:

(a) HO—$R_3$—(COOH)$_3$;

(b) (HO)$_3$—$R_3$—COOH;

(c) HO—$R_4$—(COOH)$_2$;

(d) (HO)$_2$—$R_4$—COOH;

and mixtures thereof; wherein $R_3$ and $R_4$ are independently selected from the group consisting of:

linear or branched alkyl and fluoroalkyl groups having the formula $C_nH_xF_y$, where for $R_3$, n is an integer from 1 to 10, x and y are integers from 0 to 2n-2, and the sum of x and y is 2n-2, and for $R_4$, n is an integer from 1 to 10, x and y are integers from 0 to 2n-1, and the sum of x and y is 2n-1;

an alicyclic group having 5 to 20 carbon atoms and having a valence of 4 for $R_3$ and a valence of 3 for $R_4$; and linear or branched alkenyl and fluoroalkenyl groups having the formula $C_nH_xF_y$, where for $R_3$, n is an integer from 1 to 10, x and y are integers from 0 to 2n-4, and the sum of x and y is 2n-4, and for $R_4$, n is an integer from 1 to 10, x and y are integers from 0 to 2n-3, and the sum of x and y is 2n-3.

15. The composition as set forth in claim 14 wherein said self condensable monomers are aliphatic compounds selected from the group consisting of α,α-bis-(hydroxymethyl)-acetic acid, α,α-bis-(hydroxymethyl)-propionic acid, α,α-bis-(hydroxymethyl)-butyric acid, α,α-bis-(hydroxymethyl)-valeric acid, α,α,α-tris-(hydroxymethyl)-acetic acid, α,β-dihydroxypropionic acid, α-hydroxy-malonic acid, malic acid, citric acid, and tris-(carboxymethyl)-methanol.

16. The composition as set forth in claim 15 wherein said hyperbranched polyester having a degree of branching of at least 50 percent and glass transition temperature ($T_g$) of from about 40 to 80° C.

17. The composition as set forth in claim 14 wherein said hyperbranched polyester is further end-capped with a moiety having reactive groups selected from the group consisting of epichlorohydrin, epibromohydrin, maleic anhydride, phthalic anhydride, trimellitic anhydride, p-hydroxyphenyl methyl carbinol, p-hydroxybenzyl alcohol, eleostearic acid, acrylic acid, methacrylic acid, acryloyl chloride, methacryloyl chloride, cinnamic acid, glycidyl acrylate, glycidyl methacrylate, hydroxyethyl acrylate, hydroxyethyl methacrylate, allyl alcohol, allyl chloride, allyl amine, vinyl ethyl ether, chloroethyl vinyl ether, butadiene monoepoxide, monoblocked isophorone diisocyanate, monoblocked toluene diisocyanate, chloro-dimethoxy-methylsilane, and 1-cyanoguanidine.

18. The composition as set forth in claim 14 wherein said hyperbranched polyester is further chain extended by chain linkers selected from the group consisting of ethylene glycol, 1-2-propanediol, 1-3-propanediol, 1-3-butanediol, 1-4-butanediol, 1-5-pentanediol, 1-6-hexanediol, dimethylol propane, neopentyl glycol, cyclohexane dimethanol, 1-4-xylylene glycol, pentaerythritol, trimethylolpropane, trimethylolethane, tris-(4-hydroxyphenyl)ethane, oxalic acid, malonic acid, succinic acid, glutaric acid, adipic acid, trimesic acid, ethylene oxide, propylene oxide, ethanolamine, 1-amino-2-propanol, 1-amino-3-propanol, 1-amino-4-butanol, ethylene diamine, 1,2-propylene diamine, hexamethylene diamine, 1,3-propylene diamine, triglycidyl isocyanurate, and hexamethoxymethyl melamine.

19. The composition as set forth in claim 18 wherein said hyperbranched polyester is further end-capped with a moiety having reactive groups selected from the group consisting of epichlorohydrin, epibromohydrin, maleic anhydride, phthalic anhydride, trimellitic anhydride, p-hydroxyphenyl methyl carbinol, p-hydroxybenzyl alcohol, eleostearic acid, acrylic acid, methacrylic acid, acryloyl chloride, methacryloyl chloride, cinnamic acid, glycidyl acrylate, glycidyl methacrylate, hydroxyethyl acrylate, hydroxyethyl methacrylate, allyl alcohol, allyl chloride, allyl amine, vinyl ethyl ether, chloroethyl vinyl ether, butadiene monoepoxide, monoblocked isophorone diisocyanate, monoblocked toluene diisocyanate, chloro-dimethoxy-methylsilane, and 1-cyanoguanidine.

20. The composition as set forth in claim 19 wherein said hyperbranched polyester is poly-(α,α-bis-(hydroxymethyl)-propionic acid) chain extended with hexamethylene diamine and end-capped with epichlorohydrin.

21. A process for the production of powder coating compositions comprising the steps of:
  (a) subjecting one or more of self condensable monomers to polycondensation reaction conditions for a sufficient period of time and under suitable conditions of temperature and pressure, and optionally adding one or more of chain linkers and reactive end-capping moieties to said self condensable monomers at the end of said polycondensation reaction to form the corresponding hyperbranched polymer;
  (b) melt blending suitable amounts of said hyperbranched polymer to act either as a polymeric co-reactant, or as a flow and leveling agent, or as an adhesion promotor in the presence of:
    (i) an epoxy, a polyester, a blocked urethane resin, or an acrylic resin;
    (ii) optionally a co-reactant capable of reacting with said polyester or acrylic resin;
    (iii) optionally one or more of additional ingredients selected from the group consisting of flow and leveling agents, degassers, catalysts, fillers, coloring agents, and biocides; for a sufficient period of time and under suitable conditions of temperature and pressure to form the corresponding powder coating composition in the form of flakes; and
  (c) grinding and sieving of said flakes to form the powder coating compositions.

22. The process as set forth in claim 21 wherein in step (a) the temperature is from about −10° C. to about 250° C. and the pressure is slowly reduced from atmospheric to subatmospheric at the end of the polycondensation reaction; and in step (b) the temperature is from about 50° C. to about 180° C.

23. The process as set forth in claim 21 wherein in step (a) the polycondensation conditions further include a suitable acid, base or a metal catalyst.

24. The product produced by the process of claim 21.

25. The shaped or formed article coated with the cured composition of claim 1.

26. The shaped or formed article coated with the cured composition of claim 13.

27. A process for the production of powder coating compositions comprising the steps of:
  (a) subjecting α,α-bis-(hydroxymethyl)-propionic acid to polycondensation reaction conditions in an aqueous dispersion in the presence of methanesulfonic acid as a catalyst for a period of about 15 minutes to about 8 hours at a temperature of about 120° C. to about 220° C. and at graded pressure conditions of initial 1 atmosphere to subatmospheric pressure of about 1 mbar to about 0.1 mbar at the end of the polycondensation reaction to form the corresponding hyperbranched polyester;
  (b) melt blending said hyperbranched polyester in the presence of:
    (i) a polyester;
    (ii) ε-caprolactam blocked isophorone isocyanate as the crosslinker; and
    (iii) optionally benzoin as the degasser;
  for a period of about 5 minutes to about 10 minutes at a temperature of about 50° C. to about 180° C. and at autogenic pressure to form the corresponding powder coating composition in the form of flakes; and
  (c) grinding and sieving of said flakes to form the powder coating compositions having a particle distribution of about 10 to 100 microns;
  wherein said hyperbranched polyester is used either as a flow and leveling agent in the amounts of from about 0.5 to 5 percent by weight or as a crosslinking resin in the amounts of from about 10 to 40 percent by weight based on the total weight of the powder coating composition.

28. The product produced by the process of claim 27.

29. The composition as set forth in claim 19 wherein said hyperbranched polymer is end-capped with a UV curable moiety.

30. The composition as set forth in claim 19 which is a UV curable coating composition.

* * * * *